United States Patent
Maruyama et al.

(10) Patent No.: US 8,234,354 B2
(45) Date of Patent: Jul. 31, 2012

(54) FILE TRANSFER METHOD AND FILE TRANSFER SYSTEM

(75) Inventors: Kiyoyasu Maruyama, Tokyo (JP); Chihiro Morita, Tokyo (JP); Yoshiaki Kusunoki, Tokyo (JP); Hiroshi Yamamoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 309 days.

(21) Appl. No.: 12/524,368

(22) PCT Filed: Feb. 21, 2008

(86) PCT No.: PCT/JP2008/052928
§ 371 (c)(1),
(2), (4) Date: Jul. 24, 2009

(87) PCT Pub. No.: WO2008/111376
PCT Pub. Date: Sep. 18, 2008

(65) Prior Publication Data
US 2010/0049834 A1 Feb. 25, 2010

(30) Foreign Application Priority Data

Mar. 9, 2007 (JP) .................. 2007-059317
Nov. 22, 2007 (JP) .................. 2007-302524

(51) Int. Cl.
*G06F 15/16* (2006.01)

(52) U.S. Cl. ....................................... 709/219

(58) Field of Classification Search .............. 709/217, 709/219, 231
See application file for complete search history.

(56) References Cited

U.S. PATENT DOCUMENTS

| 6,557,030 B1 * | 4/2003 | Hoang ........................ 709/217 |
| 2002/0026501 A1 * | 2/2002 | Hoang ........................ 709/219 |
| 2003/0126201 A1 * | 7/2003 | Hoang ........................ 709/203 |
| 2003/0236863 A1 * | 12/2003 | Johnson et al. ............. 709/219 |
| 2007/0239841 A1 * | 10/2007 | Lehrman .................... 709/217 |

FOREIGN PATENT DOCUMENTS

| JP | 11-24683 A | 1/1999 |
| JP | 2003-32251 A | 1/2003 |
| JP | 2003-223384 A | 8/2003 |
| JP | 2003-281018 A | 10/2003 |
| JP | 2006-4543 A | 1/2006 |

* cited by examiner

*Primary Examiner* — Jason Recek
(74) *Attorney, Agent, or Firm* — Birch, Stewart, Kolasch & Birch, LLP

(57) ABSTRACT

A file transfer method and a file transfer system are provided for making it possible to minimize aggregate waiting time of the whole users for data transfer using a multicast protocol. In the file transfer method of transferring a plurality of program files from a recorder storing a plurality of program files via a network to a plurality of mobile terminals using a multicast protocol, the recorder determines order of transfers of the plurality of program files for the purpose of transferring the plurality of program files in order of digital data files, which is the ascending order of file size of the plurality of program files (step S102), the recorder transfers the plurality of program files on the basis of the order of transfers (steps S104-S109), and the plurality of mobile terminals selectively receives the plurality of program files (steps S204-S207), thereby reducing aggregate waiting time that is a sum total of transfer time of the whole users.

9 Claims, 18 Drawing Sheets

FIG. 6

| 301 | 302 | 303 | 304 |
|---|---|---|---|
| PROGRAM C | PROGRAM A | PROGRAM B | PROGRAM D |
| 25-MIN PROGRAM | 30-MIN PROGRAM | 45-MIN PROGRAM | 1-HOUR PROGRAM |
| 1 | 2 | 3 | 4 |

ORDER OF TRANSFERS

FIG. 10

| PROGRAM No. | TRANSFER TIME OF EACH PROGRAM | USER REQUESTING TRANSFER |  |  |
|---|---|---|---|---|
| 1 | 15 | U1 | | |
| 2 | 30 | | U2 | |
| 3 | 60 | U1 | | U3 |
| 4 | 90 | U1 | U3 | U4 |
| 5 | 30 | U1 | U2 | |
| 6 | 60 | | U3 | U4 |
| 7 | 45 | | U2 | U4 |
| 8 | 60 | | U2 | U3 |
| 9 | 15 | U1 | U2 | |
| 10 | 15 | | | U5 |

FIG. 11

$$\begin{pmatrix} T1 \\ T2 \\ T3 \\ T4 \\ T5 \end{pmatrix} = \begin{pmatrix} 1 & 0 & 1 & 1 & 1 & 0 & 0 & 0 & 1 & 0 \\ 0 & 1 & 0 & 0 & 1 & 0 & 1 & 1 & 1 & 0 \\ 0 & 0 & 1 & 1 & 0 & 1 & 0 & 1 & 0 & 0 \\ 0 & 0 & 0 & 1 & 0 & 1 & 1 & 0 & 0 & 0 \\ 0 & 0 & 0 & 0 & 0 & 0 & 0 & 0 & 0 & 1 \end{pmatrix} \cdot \begin{pmatrix} 15 \\ 30 \\ 60 \\ 90 \\ 30 \\ 60 \\ 45 \\ 60 \\ 15 \\ 15 \end{pmatrix} \quad \begin{matrix} \text{PROGRAM No.} \\ 1 \\ 2 \\ 3 \\ 4 \\ 5 \\ 6 \\ 7 \\ 8 \\ 9 \\ 10 \end{matrix}$$

ORDER OF TRANSFERS →

$$\begin{pmatrix} 1 & 0 & 1 & 1 & 1 & 0 & 0 & 0 & 1 & 0 \\ 0 & 1 & 0 & 0 & 1 & 0 & 1 & 1 & 1 & 0 \\ 0 & 0 & 1 & 1 & 0 & 1 & 0 & 1 & 0 & 0 \\ 0 & 0 & 0 & 1 & 0 & 1 & 1 & 0 & 0 & 0 \\ 0 & 0 & 0 & 0 & 0 & 0 & 0 & 0 & 0 & 1 \end{pmatrix}$$

| | | | | | | | | | | | NUMBER OF PROGRA-MS TO BE TRANSF-ERRED (445) | SUM TOTAL OF TRANSFER TIME (446) |
|---|---|---|---|---|---|---|---|---|---|---|---|---|
| U1 | 1 | 0 | 1 | 1 | 1 | 0 | 0 | 0 | 1 | 0 | 5 | T1 = 210 |
| U2 | 0 | 1 | 0 | 0 | 1 | 0 | 1 | 1 | 1 | 0 | 5 | T2 = 180 |
| U3 | 0 | 0 | 1 | 1 | 0 | 1 | 0 | 1 | 0 | 0 | 4 | T3 = 270 |
| U4 | 0 | 0 | 0 | 1 | 0 | 1 | 1 | 0 | 0 | 0 | 3 | T4 = 195 |
| U5 | 0 | 0 | 0 | 0 | 0 | 0 | 0 | 0 | 0 | 1 | 1 | T5 = 15 |
| TRANSFER TIME | 15 | 30 | 60 | 90 | 30 | 60 | 45 | 60 | 15 | 15 | | T1+T2+T3+T4+T5 = 870 |
| PROGRAM No. | 1 | 2 | 3 | 4 | 5 | 6 | 7 | 8 | 9 | 10 | | |

(441) (442) (443) (444)

SUM TOTAL OF TRANSFER TIME OF EACH USER

FIG. 14

| | | | | | | | | | | | NUMBER OF PROGRA-MS TO BE TRANSF-ERRED (445) | SUM TOTAL OF TRANSFER TIME (446) | WAITING TIME UNTIL TRANSFER COMPLETION OF ALL PROGRAMS TO BE TRANSFERRED (447) |
|---|---|---|---|---|---|---|---|---|---|---|---|---|---|
| U1 | 1 | 0 | 1 | 1 | 1 | 0 | 0 | 0 | 1 | 0 | 5 | T1 = 210 | P1 = 405 |
| U2 | 0 | 1 | 0 | 0 | 1 | 0 | 1 | 1 | 1 | 0 | 5 | T2 = 180 | P2 = 405 |
| U3 | 0 | 0 | 1 | 1 | 0 | 1 | 0 | 1 | 0 | 0 | 4 | T3 = 270 | P3 = 390 |
| U4 | 0 | 0 | 0 | 1 | 0 | 1 | 1 | 0 | 0 | 0 | 3 | T4 = 195 | P4 = 330 |
| U5 | 0 | 0 | 0 | 0 | 0 | 0 | 0 | 0 | 0 | 1 | 1 | T5 = 15 | P5 = 420 |
| TRANSFER TIME | 15 | 30 | 60 | 90 | 30 | 60 | 45 | 60 | 15 | 15 | | T1+T2+T3+T4+T5 = 870 | P1+P2+P3+P4+P5 = 1950 |
| PROGRAM No. | 1 | 2 | 3 | 4 | 5 | 6 | 7 | 8 | 9 | 10 | | | |

(441) (442) (443) (444)

ORDER OF TRANSFERS →

|  | | | | | | | | | | | NUMBER OF PROGRA-MS TO BE TRANSF-ERRED | SUM TOTAL OF TRANSFER TIME | WAITING TIME UNTIL TRANSFER COMPLETION OF ALL PROGRAMS TO BE TRANSFERRED |
|---|---|---|---|---|---|---|---|---|---|---|---|---|---|
| U1 | 1 | 1 | 0 | 0 | 1 | 0 | 1 | 0 | 0 | 1 | 5 | T1 = 210 | P1 = 420 |
| U2 | 0 | 1 | 0 | 1 | 1 | 1 | 0 | 0 | 1 | 0 | 5 | T2 = 180 | P2 = 330 |
| U3 | 0 | 0 | 0 | 0 | 0 | 0 | 1 | 1 | 1 | 1 | 4 | T3 = 270 | P3 = 420 |
| U4 | 0 | 0 | 0 | 0 | 0 | 1 | 0 | 1 | 0 | 1 | 3 | T4 = 195 | P4 = 420 |
| U5 | 0 | 0 | 1 | 0 | 0 | 0 | 0 | 0 | 0 | 0 | 1 | T5 = 15 | P5 = 45 |
| TRANSFER TIME | 15 | 15 | 15 | 30 | 30 | 45 | 60 | 60 | 60 | 90 | | T1+T2+T3+T4+T5 = 870 | P1+P2+P3+P4+P5 = 1635 |
| PROGRAM No. | 1 | 9 | 10 | 2 | 5 | 7 | 3 | 6 | 8 | 4 | | | |

ORDER OF TRANSFERS ⟶

FIG. 18

| | 1 | 2 | 3 | 4 | 5 | 6 | 7 | 8 | 9 | 10 | NUMBER OF PROGRAMS TO BE TRANSFERRED | SUM TOTAL OF TRANSFER TIME |
|---|---|---|---|---|---|---|---|---|---|---|---|---|
| U5 | 0 | 0 | 0 | 0 | 0 | 0 | 0 | 0 | 0 | 1 | 1 | T5 = 15 |
| U4 | 0 | 0 | 0 | 1 | 0 | 1 | 1 | 0 | 0 | 0 | 3 | T4 = 195 |
| U3 | 0 | 0 | 1 | 1 | 0 | 1 | 0 | 1 | 0 | 0 | 4 | T3 = 270 |
| U1 | 1 | 0 | 1 | 1 | 1 | 0 | 0 | 0 | 1 | 0 | 5 | T1 = 210 |
| U2 | 0 | 1 | 0 | 0 | 1 | 0 | 1 | 1 | 1 | 0 | 5 | T2 = 180 |
| TRANSFER TIME | 15 | 30 | 60 | 90 | 30 | 60 | 45 | 60 | 15 | 15 | T5+T4+T3+T1+T2 = 870 | |
| PROGRAM No. | 1 | 2 | 3 | 4 | 5 | 6 | 7 | 8 | 9 | 10 | | |

FIG. 19

| | | | | | | | | | | | NUMBER OF PROGRAMS TO BE TRANSFERRED | SUM TOTAL OF TRANSFER TIME | WAITING TIME UNTIL TRANSFER COMPLETION OF ALL PROGRAMS TO BE TRANSFERRED |
|---|---|---|---|---|---|---|---|---|---|---|---|---|---|
| U5 | 1 | 0 | 0 | 0 | 0 | 0 | 0 | 0 | 0 | 0 | 1 | T5 = 15 | P5 = 15 |
| U4 | 0 | 1 | 1 | 1 | 0 | 0 | 0 | 0 | 0 | 0 | 3 | T4 = 195 | P4 = 210 |
| U3 | 0 | 1 | 1 | 0 | 1 | 1 | 0 | 0 | 0 | 0 | 4 | T3 = 270 | P3 = 330 |
| U1 | 0 | 1 | 0 | 0 | 1 | 0 | 1 | 1 | 1 | 0 | 5 | T1 = 210 | P1 = 390 |
| U2 | 0 | 0 | 0 | 1 | 0 | 1 | 1 | 1 | 0 | 1 | 5 | T2 = 180 | P2 = 420 |
| TRANSFER TIME | 15 | 90 | 60 | 45 | 60 | 60 | 30 | 15 | 15 | 30 | | T5+T4+T3+T1+T2 = 870 | P5+P4+P3+P1+P2 = 1365 |
| PROGRAM No. | 10 | 4 | 6 | 7 | 3 | 8 | 5 | 9 | 1 | 2 | | | |

ORDER OF TRANSFERS →

FIG. 20

| PROGRAM No. | TRANSFER TIME | USER REQUESTING TRANSFER | | |
|---|---|---|---|---|
| 1 | 15 | U1 | U2 | U3 |
| 2 | 15 | U1 | U2 | U3 |
| 3 | 15 | U1 | | |
| 4 | 15 | | U2 | U3 |
| 5 | 30 | U1 | | |
| 6 | 30 | | U2 | |
| 7 | 30 | | U3 | U4 |
| 8 | 60 | | | U5 |
| 9 | 60 | | U4 | U5 |
| 10 | 90 | | U4 | U5 |

FIG. 22

| | | | | | | | | | | | NUMBER OF PROGRAMS TO BE TRANSFE-RRED | SUM TOTAL OF TRANSFER TIME | WAITING TIME UNTIL TRANSFER COMPLETION OF ALL PROGRAMS TO BE TRANSFERRED |
|---|---|---|---|---|---|---|---|---|---|---|---|---|---|
| U1 | 1 | 1 | 1 | 1 | 0 | 0 | 0 | 0 | 0 | 0 | 4 | T1 = 75 | P1 = 75 |
| U2 | 1 | 1 | 0 | 0 | 1 | 1 | 0 | 0 | 0 | 0 | 4 | T2 = 75 | P2 = 120 |
| U3 | 1 | 1 | 0 | 0 | 1 | 0 | 1 | 0 | 0 | 0 | 4 | T3 = 75 | P3 = 150 |
| U4 | 0 | 0 | 0 | 0 | 0 | 0 | 1 | 1 | 1 | 0 | 3 | T4 = 180 | P4 = 300 |
| U5 | 0 | 0 | 0 | 0 | 0 | 0 | 0 | 1 | 1 | 1 | 3 | T5 = 210 | P5 = 360 |
| TRANSFER TIME | 15 | 15 | 15 | 30 | 15 | 30 | 30 | 60 | 90 | 60 | | T1+T2+T3+T4+T5 = 615 | P1+P2+P3+P4+P5 = 1005 |
| PROGRAM No. | 1 | 2 | 3 | 5 | 4 | 6 | 7 | 9 | 10 | 8 | | | |

ORDER OF TRANSFERS →

FIG. 23

| | | | | | | | | | | | NUMBER OF PROGRAMS TO BE TRANSFE-RRED | SUM TOTAL OF TRANSFER TIME | WAITING TIME UNTIL TRANSFER COMPLETION OF ALL PROGRAMS TO BE TRANSFERRED |
|---|---|---|---|---|---|---|---|---|---|---|---|---|---|
| U1 | 1 | 1 | 1 | 0 | 1 | 0 | 0 | 0 | 0 | 0 | 4 | T1 = 75 | P1 = 90 |
| U2 | 1 | 1 | 0 | 1 | 0 | 1 | 0 | 0 | 0 | 0 | 4 | T2 = 75 | P2 = 120 |
| U3 | 1 | 1 | 0 | 1 | 0 | 0 | 1 | 0 | 0 | 0 | 4 | T3 = 75 | P3 = 150 |
| U4 | 0 | 0 | 0 | 0 | 0 | 0 | 1 | 0 | 1 | 1 | 3 | T4 = 180 | P4 = 360 |
| U5 | 0 | 0 | 0 | 0 | 0 | 0 | 0 | 1 | 1 | 1 | 3 | T5 = 210 | P5 = 360 |
| TRANSFER TIME | 15 | 15 | 15 | 15 | 30 | 30 | 30 | 60 | 60 | 90 | | T1+T2+T3+T4+T5 = 615 | P1+P2+P3+P4+P5 = 1080 |
| PROGRAM No. | 1 | 2 | 3 | 4 | 5 | 6 | 7 | 8 | 9 | 10 | | | |

ORDER OF TRANSFERS →

| | | | | | | | | | | | NUMBER OF PROGRA-MS TO BE TRANSF-ERRED | SUM TOTAL OF TRANSFER TIME | WAITING TIME UNTIL TRANSFER COMPLETION OF ALL PROGRAMS TO BE TRANSFERRED |
|---|---|---|---|---|---|---|---|---|---|---|---|---|---|
| U4 | 1 | 1 | 1 | 0 | 0 | 0 | 0 | 0 | 0 | 0 | 3 | T4 = 180 | P4 = 180 |
| U5 | 1 | 1 | 0 | 1 | 0 | 0 | 0 | 0 | 0 | 0 | 3 | T5 = 210 | P5 = 240 |
| U1 | 0 | 0 | 0 | 0 | 1 | 1 | 1 | 1 | 0 | 0 | 4 | T1 = 75 | P1 = 315 |
| U2 | 0 | 0 | 0 | 0 | 1 | 1 | 0 | 0 | 1 | 1 | 4 | T2 = 75 | P2 = 360 |
| U3 | 0 | 0 | 1 | 0 | 1 | 1 | 0 | 0 | 1 | 0 | 4 | T3 = 75 | P3 = 330 |
| TRANSFER TIME | 60 | 90 | 30 | 60 | 15 | 15 | 15 | 30 | 15 | 30 | | T4+T5+T1+T2+T3 = 615 | P4+P5+P1+P2+P3 = 1425 |
| PROGRAM No. | 9 | 10 | 7 | 8 | 1 | 2 | 3 | 5 | 4 | 6 | | | |

ORDER OF TRANSFERS →

| | | | | | | | | | | | NUMBER OF PROGRA-MS TO BE TRANSF-ERRED | SUM TOTAL OF TRANSFER TIME | WAITING TIME UNTIL TRANSFER COMPLETION OF ALL PROGRAMS TO BE TRANSFERRED |
|---|---|---|---|---|---|---|---|---|---|---|---|---|---|
| U5 | 1 | 0 | 0 | 0 | 0 | 0 | 0 | 0 | 0 | 0 | 1 | T5 = 15 | P5 = 15 |
| U2 | 0 | 1 | 1 | 1 | 1 | 1 | 0 | 0 | 0 | 0 | 5 | T2 = 180 | P2 = 195 |
| U4 | 0 | 1 | 0 | 0 | 0 | 0 | 1 | 1 | 0 | 0 | 3 | T4 = 195 | P4 = 345 |
| U1 | 0 | 0 | 0 | 1 | 1 | 0 | 1 | 0 | 1 | 1 | 5 | T1 = 210 | P1 = 420 |
| U3 | 0 | 0 | 1 | 0 | 0 | 0 | 1 | 1 | 1 | 0 | 4 | T3 = 270 | P3 = 405 |
| TRANSFER TIME | 15 | 45 | 60 | 30 | 15 | 30 | 90 | 60 | 60 | 15 | | T5+T2+T4+T1+T3 = 870 | P5+P2+P4+P1+P3 =1380 |
| PROGRAM No. | 10 | 7 | 8 | 5 | 9 | 2 | 4 | 6 | 3 | 1 | | | |

ORDER OF TRANSFERS →

FILE TRANSFER METHOD AND FILE TRANSFER SYSTEM

TECHNICAL FIELD

The present invention relates to a file transfer method and a file transfer system for transferring a plurality of digital data files from an information recording apparatus storing a plurality of digital data files via a network to a plurality of terminal devices using a multicast protocol.

BACKGROUND ART

In recent years, a method is proposed in which a digital data file, for example, an audio visual (AV) data file, is transferred to a mobile terminal to be played back in the mobile terminal (e.g., refer to Patent Document 1).

Further, even if the digital AV data is data compressed using MPEG4-AVC or the like, its size is several ten to several hundred times as large as that of the audio data, and therefore it takes a long time to transfer the digital AV data to a mobile terminal. Furthermore, when the digital AV data stored in a recorder is transferred to a plurality of mobile terminals, transfer time corresponding to the number of mobile terminals is necessary.

For this reason, a method is proposed in which a one-to-multi transfer is performed using a multicast protocol as a method of efficiently transferring digital AV data stored in a recorder to a plurality of mobile terminals (e.g., refer to Patent Document 2).

Patent Document 1 is Japanese Patent Application Kokai Publication No. 2006-4543 (page 1, FIG. 3).

Patent Document 2 is Japanese Patent Application Kokai Publication No. 2003-223384 (page 1, FIG. 1).

DISCLOSURE OF THE INVENTION

Problems to be Solved by the Invention

However, there are the following problems when a large amount of AV data files are transferred by the conventional transfer method of transferring a plurality of data files to a plurality of mobile terminals using a multicast protocol. For example, there are occasions when AV data files having a large amount of data are transferred to other users (other mobile terminals) before a data transfer to a user (a mobile terminal) requesting only a small amount of AV data files. In such case, the transfer completion for the user (the mobile terminal) requesting only a small amount of AV data files is undesirably deferred to excess, a level of satisfaction of the user in question to the data transfer service decreases excessively. Further, when the transfer completion for the user (the mobile terminal) requesting only a small amount of AV data files is undesirably deferred to excess, there is a problem that aggregate waiting time as a total value of the waiting time of the whole users (mobile terminals) using a multicast protocol increases undesirably and therefore a level of satisfaction of the whole users to the data transfer service decreases.

Therefore, the present invention has been made in order to resolve the above-described problems and its object is to provide a file transfer method and a file transfer system that can shorten aggregate waiting time of the whole users using a multicast protocol.

Means for Solving the Problems

A file transfer method according to the present invention is a method of transferring a plurality of digital data files using a multicast protocol from an information recording apparatus storing the plurality of digital data files via a network to a plurality of terminal devices, the method including: a step, in which the information recording apparatus determines order of transfers when transferring the plurality of digital data files to the plurality of terminal devices; a step, in which the information recording apparatus transfers the plurality of digital data files in the order of transfers; and a step, in which the plurality of terminal devices selectively receives the plurality of digital data files.

Further, a file transfer system according to the present invention includes: an information recording apparatus capable of performing communication via a network; and a plurality of terminal devices capable of performing communication via the network; wherein the information recording apparatus includes: a first interface means for performing communication via the network; a recording means for storing a plurality of digital data files; a transfer order determination means for determining order of transfers of the plurality of digital data files; and a transfer control means for executing control operation for transferring the plurality of digital data files via the network using a multicast protocol; wherein each of the plurality of terminal devices includes: a second interface means for performing communication via the network; and a receipt control means for executing control operation for selectively receiving the plurality of digital data files.

EFFECTS OF THE INVENTION

The file transfer method or the file transfer system of the present invention can provide an advantageous effect that aggregate waiting time of the whole users using a multicast protocol can be shortened and as a result, a level of satisfaction of the whole users can be raised.

BRIEF DESCRIPTION OF THE DRAWINGS

FIG. 6 is an explanatory diagram showing the order of transfers of the program files in the first embodiment.

FIG. 10 is a diagram showing an example of a transfer program list in a file transfer method according to the second embodiment of the present invention.

FIG. 11 is a diagram showing a determinant used for obtaining transfer time necessary for transferring a program file(s) to a mobile terminal of each user from a transfer program list in FIG. 10.

FIG. 12 is a diagram showing an example of a relationship between a matrix in the determinant shown in FIG. 11 and order of transfers.

FIG. 13 is a diagram showing sum totals of transfer time for each user in a tabular form.

FIG. 14 is a diagram showing waiting time until transfer completion for each user in a tabular form when the order of transfers is the order of program numbers.

FIG. 16 is a diagram showing waiting time until transfer completion for each user in a tabular form in the second embodiment (the order of transfers is the order of programs, which is the ascending order of transfer time).

FIG. 18 is a diagram showing a state after step (S413) of arrangement of each row in FIG. 17 in a tabular form.

FIG. 19 is a diagram showing waiting time until transfer completion of each user in a tabular form in the third embodiment (the order of transfers is the order of users, which is the ascending order of the number of programs to be transferred).

FIG. 20 is a diagram showing an example of a transfer program list in a file transfer method according to the fourth embodiment of the present invention.

FIG. 22 is a diagram showing waiting time until transfer completion of each user in a tabular form in the fourth embodiment (the order of transfers is the order of users, which is the ascending order of sum totals of transfer time).

FIG. 23 is a diagram showing waiting time until transfer completion for each user in a tabular form when the order of transfers is the order of programs, which is the ascending order of transfer time.

FIG. 24 is a diagram showing waiting time until transfer completion for each user in a tabular form when the order of transfers is the order of users, which is the ascending order of the number of programs to be transferred.

FIG. 25 is a diagram showing waiting time until transfer completion for each user in a tabular form when the order of transfers is the order of users, which is the ascending order of the sum totals of transfer time.

EXPLANATION OF CHARACTERS 10 recorder (information recording apparatus); 11 monitor; 12 speaker; 21, 31, 41 mobile terminal (terminal device); 81 network; 91 television broadcasting station; 101 CPU; 102 program ROM; 103 memory; 104 decoder; 105 wireless network I/F; 106 graphic controller; 107 sound controller; 108 hard disk controller; 109 hard disk drive; 110 remote controller receiver; 111 remote controller; 112 encoder/transcoder; 115 tuner; 121 bus; 201 CPU; 202 program ROM; 203 memory; 204 decoder; 205 wireless network I/F; 206 graphic controller; 207 sound controller; 208 large-capacity memory; 210 operation button; 211 monitor; 212 speaker; 221 bus; 301 to 304 program file; 400, 500 transfer program list; U1 to U5 user; T1 to T5 sum total of transfer time for each user; P1 to P5 waiting time for each user.

BEST MODE FOR CARRYING OUT THE INVENTION

First Embodiment

Figure 1:
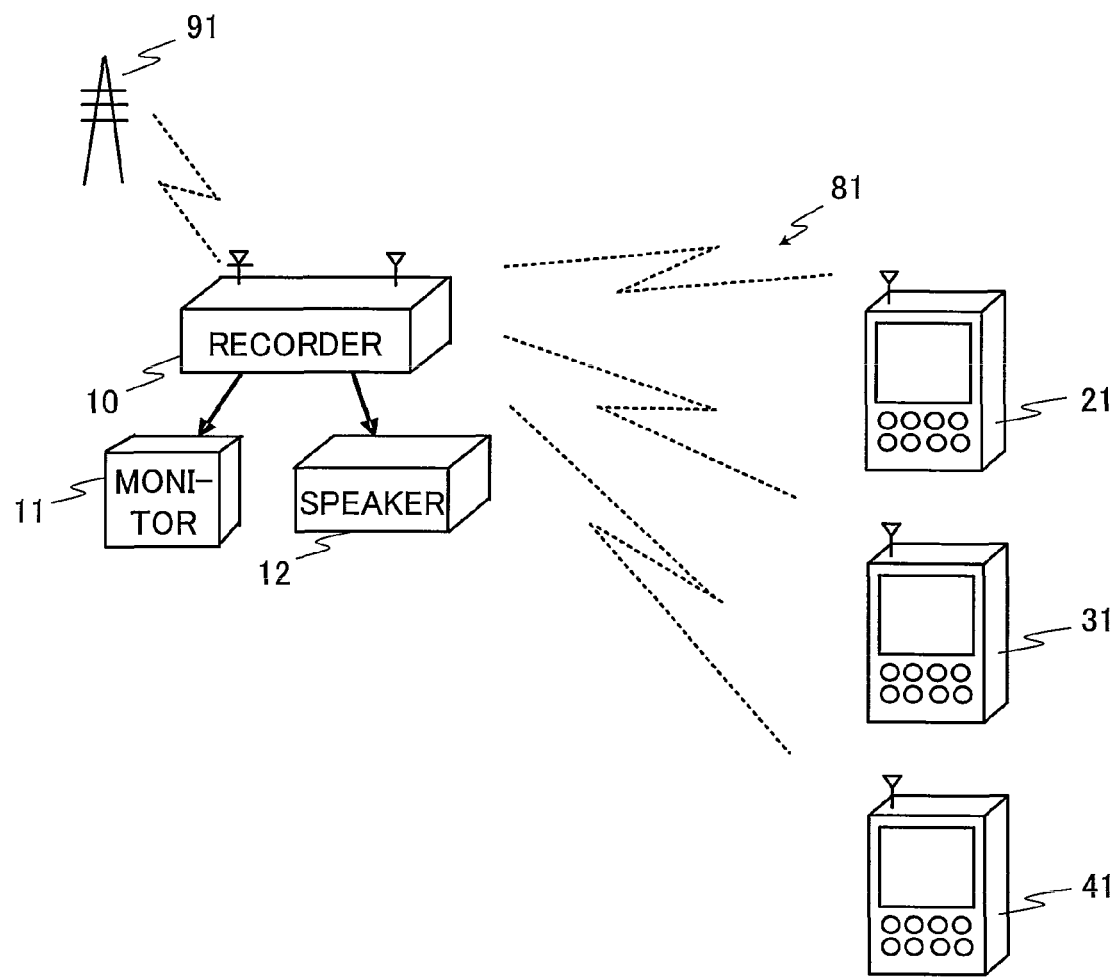
FIG. 1 is a diagram schematically showing a configuration of a system for performing a file transfer method according to the first embodiment (a file transfer system according to the first embodiment) of the present invention.

FIG. 1 is a diagram schematically showing a configuration of a file transfer system according to the first embodiment (i.e., a system for performing a file transfer method according to the first embodiment) of the present invention. As shown in FIG. 1, the file transfer system of the first embodiment includes a recorder 10 as an information recording apparatus capable of performing communication via a network 81, and mobile terminals 21, 31 and 41 as a plurality of terminal devices capable of performing communication via the network 81. However, the number of mobile terminals is not limited to three, but it may be another number. The file transfer system of the first embodiment performs a file transfer method of transferring a plurality of digital data files using a multicast protocol from the recorder 10 storing a plurality of digital data files via the network 81 to a plurality of mobile terminals 21, 31 and 41.

The recorder 10 shown in FIG. 1 is, for example, an AV equipment such as a hard disk recorder or an audio visual (AV) server. The recorder 10 has a function of receiving a broadcast program transmitted as a broadcast wave (a television signal) from a television broadcasting station 91, converting the received broadcast program to a digital data file (a received digital data file in the case of digital broadcasting), and recording it on an information record medium such as a hard disk or an optical disk, and a function of transferring the recorded digital data file (hereinafter also referred to as a "program file") using a multicast protocol via the network 81. A monitor 11 for displaying an image based on a video signal output from the recorder 10 and a speaker 12 for outputting a sound based on an audio signal output from the recorder 10 are connected to the recorder 10. The monitor 11 and the speaker 12 can be replaced by a television set having functions of both of them. The network 81 shown in FIG. 1 is a wired or wireless network, for example, a wireless LAN.

As shown in FIG. 1, the terminal devices in the first embodiment are mobile terminals 21, 31 and 41 capable of performing communication via the network 81. Each of the mobile terminals 21, 31 and 41 has a function of receiving a digital data file via the network 81 and a function of reproducing video and audio. The mobile terminals 21, 31 and 41 are, for example, personal computers (PCs), mobile phones, or the like.

Figure 2:
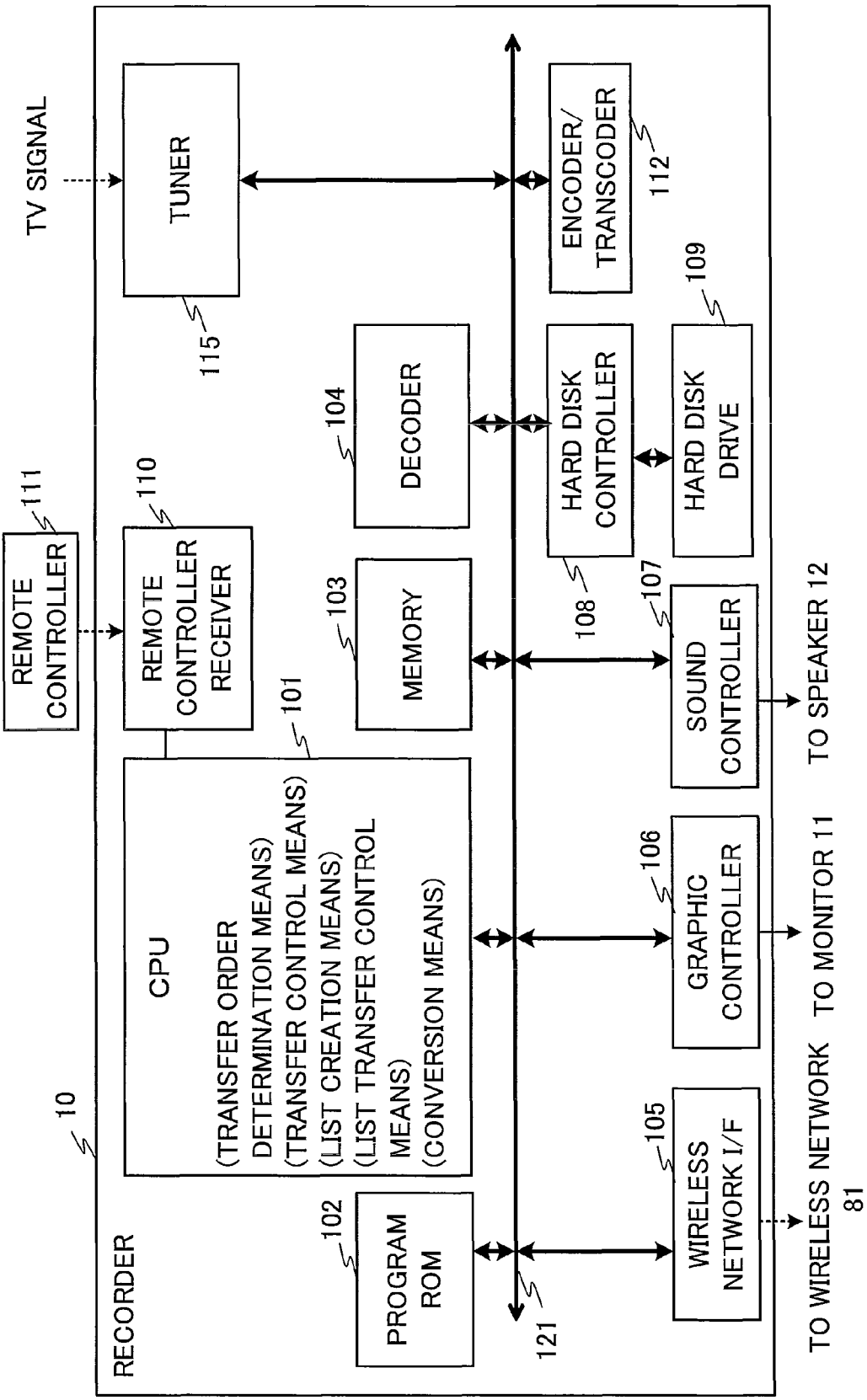
FIG. 2 is a block diagram schematically showing a configuration of a recorder in FIG. 1.

FIG. 2 is a block diagram schematically showing a configuration of the recorder 10 shown in FIG. 1. As shown in FIG. 2, the recorder 10 includes a CPU 101, a program ROM 102 for storing a program, a memory 103, a decoder 104, a wireless network interface (I/F) 105 that enables communication performed via the wireless network 81, a graphic controller 106, a sound controller 107, a hard disk controller 108, a hard disk drive 109 (recording means), a remote controller receiver 110 for receiving a command signal (e.g., optical pulses) from a remote controller 111, an encoder/transcoder 112, a tuner 115 for receiving a television signal transmitted from the TV broadcasting station 91, and a bus 121, to which the above-mentioned components are connected.

The CPU 101 executes a program recorded on the program ROM 102 using the memory 103, and controls operation of the entire recorder 10. As shown in FIG. 2, for the sake of transferring a plurality of program files in order of program files, which is the ascending order of file size, the CPU 101 has a function as a transfer order determination means for determining the order of transfers of a plurality of program files and a function as a transfer control means for executing control operation for transferring a plurality of program files via the network 81 using a multicast protocol. Further, the CPU 101 has a function as a list creation means for creating a list (a transfer program list) of the program files to be transferred to the plurality of mobile terminals 21, 31 and 41, and a function as a list transfer control means for executing control operation for transferring the transfer program list via the network 81 to the plurality of mobile terminals 21, 31 and 41. The transfer program list may include transfer time predicted to be necessary for a transfer of each of the plurality of program files. Furthermore, the CPU 101 has a function as a conversion means for converting a format of the plurality of program files.

A remote controller receiver 110 receives input information input through the remote controller 111 by the user, and transmits it to the CPU 101. The encoder/transcoder 112 encodes a TV signal received by a tuner 115 to the digital data such as MPEG2 or MPEG-AVC to generate the AV data files and/or converts (transcodes) the AV data files to the AV data for mobile terminal to generate the AV data files for mobile terminal.

The hard disk controller 108 controls the hard disk drive 109 on the basis of a control signal from the CPU 101. The controls by the hard disk controller 108 include a control for recording the AV data files generated by the encoder/transcoder 112 or the AV data files for mobile terminal on the hard disk drive 109; and a control of a process of recording the as-is digital data as the AV data files on the hard disk drive 109 if the TV signal from the tuner 115 is a digital broadcasting signal, a process of reading the AV data files recorded on the hard disk drive 109 and transmitting it to the decoder 104 for playback, and a process of transmitting it to the wireless network interface (I/F) 105 in order to transmit it to another equipment.

The decoder 104 performs processing of expanding and reproducing a TV signal of digital broadcasting received by the tuner 115 and/or processing of expanding and reproducing an AV data file stored in the hard disk drive 109 connected via the disk controller 108.

The graphic controller 106 produces image data to be displayed on the monitor 11 on the basis of a control signal from the CPU 101. Further, the graphic controller 106 outputs a signal, which is produced by superimposing the generated image data over a video signal expanded by the decoder 104, to the monitor 11. The sound controller 107 receives a music signal expanded by the decoder 104 on the basis of a control signal from the CPU 101, performs audio processing to it for playback, and outputs it to the speaker 12.

Figure 3:
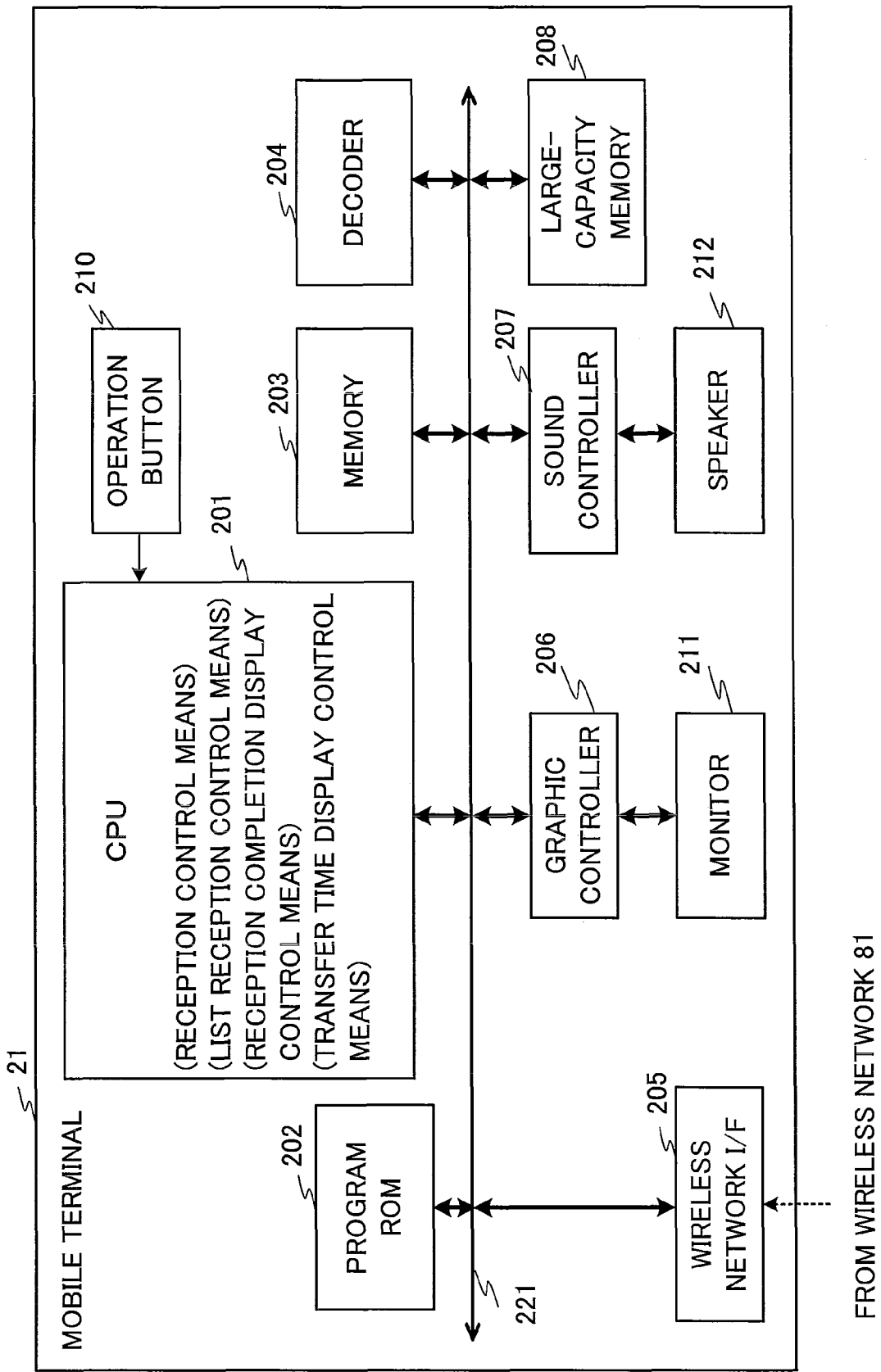
FIG. 3 is a block diagram schematically showing a configuration of a mobile terminal in FIG. 1.

FIG. 3 is a block diagram schematically showing a configuration of the mobile terminal 21 shown in FIG. 1. Further, the other mobile terminals 31 and 41 have the same configuration as the mobile terminal 21. As shown in FIG. 3, the mobile terminal 21 includes a CPU 201, a program ROM 202 for storing a program, a memory 203, a decoder 204, a wireless network interface (I/F) 205 that enables communication performed via the wireless network 81, a graphic controller 206, a sound controller 207, a large-capacity memory 208, an operation button 210 used for operating the mobile terminal 21 by the user, a monitor 211, a speaker 212, and a bus 221, to which the above-mentioned components are connected.

The operation button 210 is a button for user's operation which is operated to control the mobile terminal 21. The CPU 201 controls each device on the basis of the input from the operation button 210 and the program in the program ROM 202 and performs processing in response to the user's input. As shown in FIG. 3, the CPU 201 has a function as a receipt control means for executing control operation for selectively receiving a plurality of program files and a function as a list receipt control means for executing control operation for receiving the program transfer list. The receipt control means controls whether it receives the program file or not on the basis of the program transfer lists received by the plurality of mobile terminals 21, 31 and 41. Further, the CPU 201 may have a function as a receipt completion display control means for executing control operation for causing each of the plurality of mobile devices 21, 31 and 41 to display receipt completion of a video file on the monitor 211, for example. Furthermore, the CPU 201 may have a function as a transfer time display control means for executing control operation for displaying transfer time on the basis of the transfer time included in the transfer program list.

The large-capacity memory 208 is implemented by, for example, a NAND Flash ROM or the like. The large-capacity memory 208 stores a program file as an AV data file transferred via the wireless network 81 from the recorder 10. The decoder 204 expands the program file stored in the large-capacity memory 208 to play back it.

The graphic controller 206 generates image data to be displayed on the monitor 211 on the basis of a control signal from the CPU 201. The graphic controller 206 causes the monitor 211 to display an image based on a signal obtained by superimposing the generated image data over the video signal expanded by the decoder 204. The sound controller 207 receives an audio signal expanded by the decoder 204 and performs audio processing for reproducing a sound in the speaker 212 on the bases of a control signal from the CPU 201.

Next, the operation of the file transfer system of the first embodiment (i.e., the file transfer method according to the first embodiment) will be described. To be concrete, the operation when the program file recorded on the recorder 10 is transferred to the mobile terminals 21, 31 and 41 will be described. The program file to be recorded on the recorder 10 is produced by, for example, recording the broadcast program transmitted from the TV broadcasting station 91. However, the program file to be recorded on the recorder 10 is not limited to the above-mentioned example. The program files have different file sizes in accordance with lengths of programs. In general, in the case of the AV data file, the file size becomes larger with a level of picture quality and a time length of program.

The recorder 10 receives a broadcast wave from the TV broadcasting station 91 on the basis of the user's operation of the remote controller 111 and converts the received signal to digital data or, if the TV broadcasting is digital broadcasting, uses digital data as it is, to record the digital data as a program file on the hard disk drive 109. Then, on the basis of the user's operation by the remote controller 111, the recorded program file is expanded and reproduced, thereby causing the monitor 11 to display it and causing the speaker 12 to output a sound.

Further, the recorder 10 transfers a program file via the wireless network 81 using a multicast protocol in order to cause the mobile terminals 21, 31 and 41 connected to the network to play back it. At this time, the memory capacity and performance for playing back the AV data of the mobile terminals 21, 31 and 41 are generally inferior to that of the recorder 10, and a size of the screen for playback is also smaller. For these reasons, the AV data to be transferred may be converted so that the screen size and picture quality become adequate for each of the mobile terminals, and then be transferred to them as the simplified AV data for the mobile terminal. The mobile terminals 21, 31 and 41 expand the transferred AV data, or expand the AV data for the mobile terminal to play back it.

Figure 4:
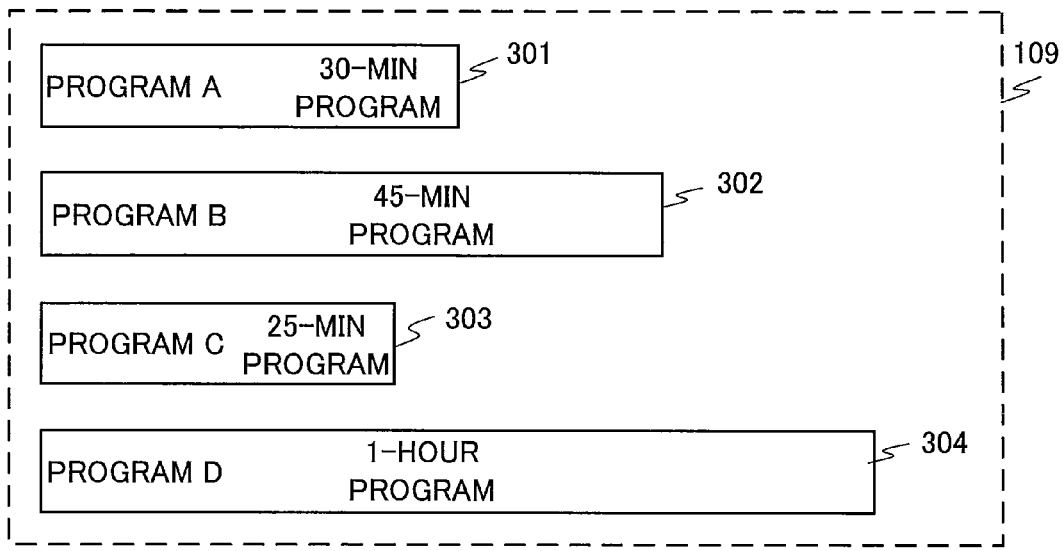
FIG. 4 is an explanatory diagram showing an example of program files recorded on the recorder in FIG. 1.

FIG. 4 is a diagram for explaining an example of program files recorded on the recorder 10. As shown in FIG. 4, the hard disk drive 109 stores, for example, a program-A file 301 recording a 30-minutes program, a program-B file 302 recording a 45-minutes program, a program-C file 303 recording a 25-minutes program, and a program-D file 304 recording a 1-hour program. In FIG. 4, a lateral length of a rectangle is proportional to file size. However, the program files recorded on the recorder 10 are not limited to the example described above.

Figure 5:
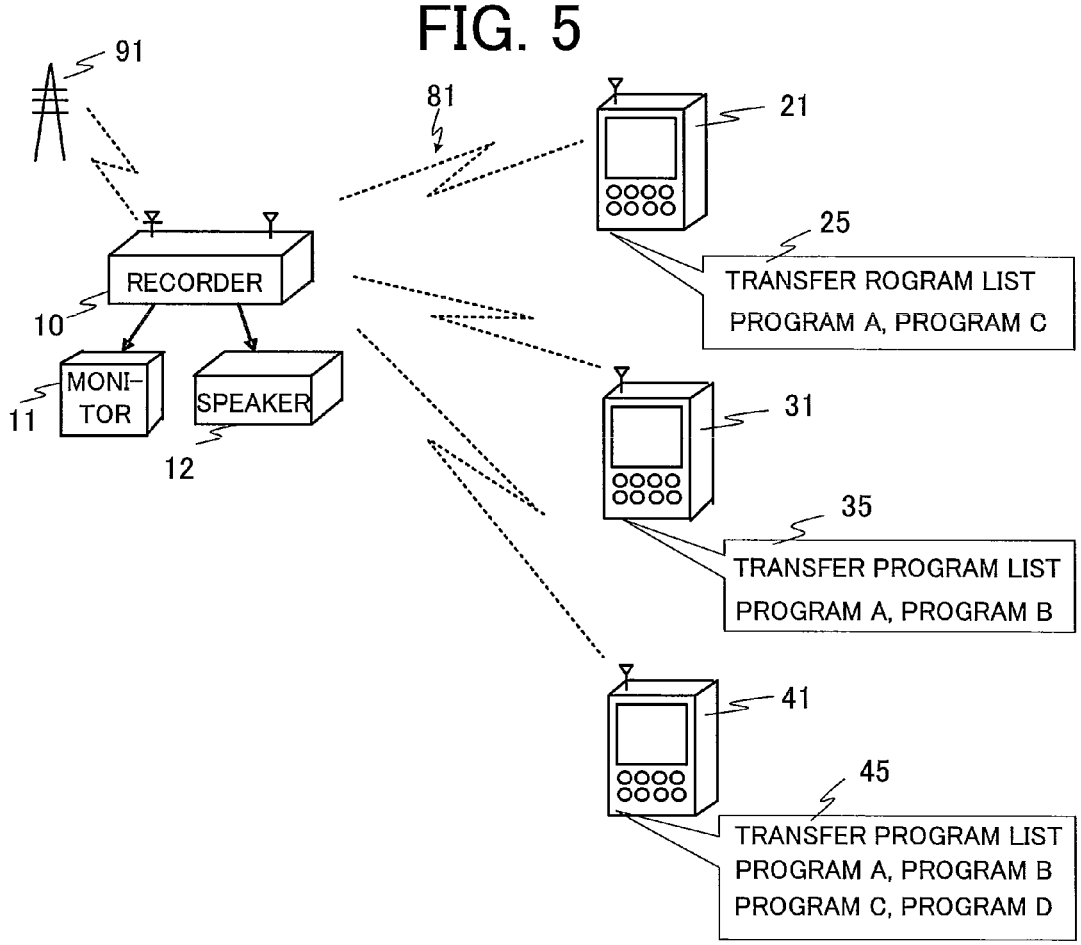
FIG. 5 is an explanatory diagram showing an example of transfer program lists in the first embodiment.

FIG. 5 is an explanatory diagram showing transfer program lists received by the mobile terminals in the first embodiment. First, the recorder 10 transfers the transfer program lists indicating a program file(s) to be transferred to the mobile terminals 21, 31 and 41 via the network 81. For example, as shown in FIG. 5, a transfer program list 25 indicating that program A and program C will be transferred is transferred to the mobile terminal 21, a transfer program list 35 indicating that program A and program B will be transferred is transferred to the mobile terminal 31, and a transfer program list 45 indicating that program A, program B, program C and program D will be transferred is transferred to the mobile terminal 41. Further, the recorder 10 also can determine a transfer rate when transferring it to each of the mobile terminals 21, 31 and 41 on the basis of, for example, an average transfer rate of past transfers, calculate transfer time predicted to be necessary for a transfer from the file size and the transfer rate, and attach it to the transfer program list.

Next, the data transfers between the recorder 10 and the mobile terminals 21, 31 and 41 are performed using a multicast transfer. Since the multicast data transfer does not assure the data, it adopts an error correction such as Forward Error Correction (FEC) or the like, in which redundant data is added to the data to be transferred and data is restored when disposal or error of the data is detected, instead of resending the data.

FIG. 6 is an explanatory diagram showing the order of transfers of the program files in the first embodiment. In the first embodiment, when the recorder 10 transfers the program files to the mobile terminals 21, 31 and 41 using a multicast protocol, the order of transfers of the program files is the order of the files, which is the ascending order of file size. That is, if the program files in the example of the program files shown in FIG. 4 are arranged in ascending order of file size, as shown in FIG. 6, program C, program A, program B, and program D are arranged in this order. For this reason, the order of transfers from the recorder 10 is like FIG. 6.

Figure 7:
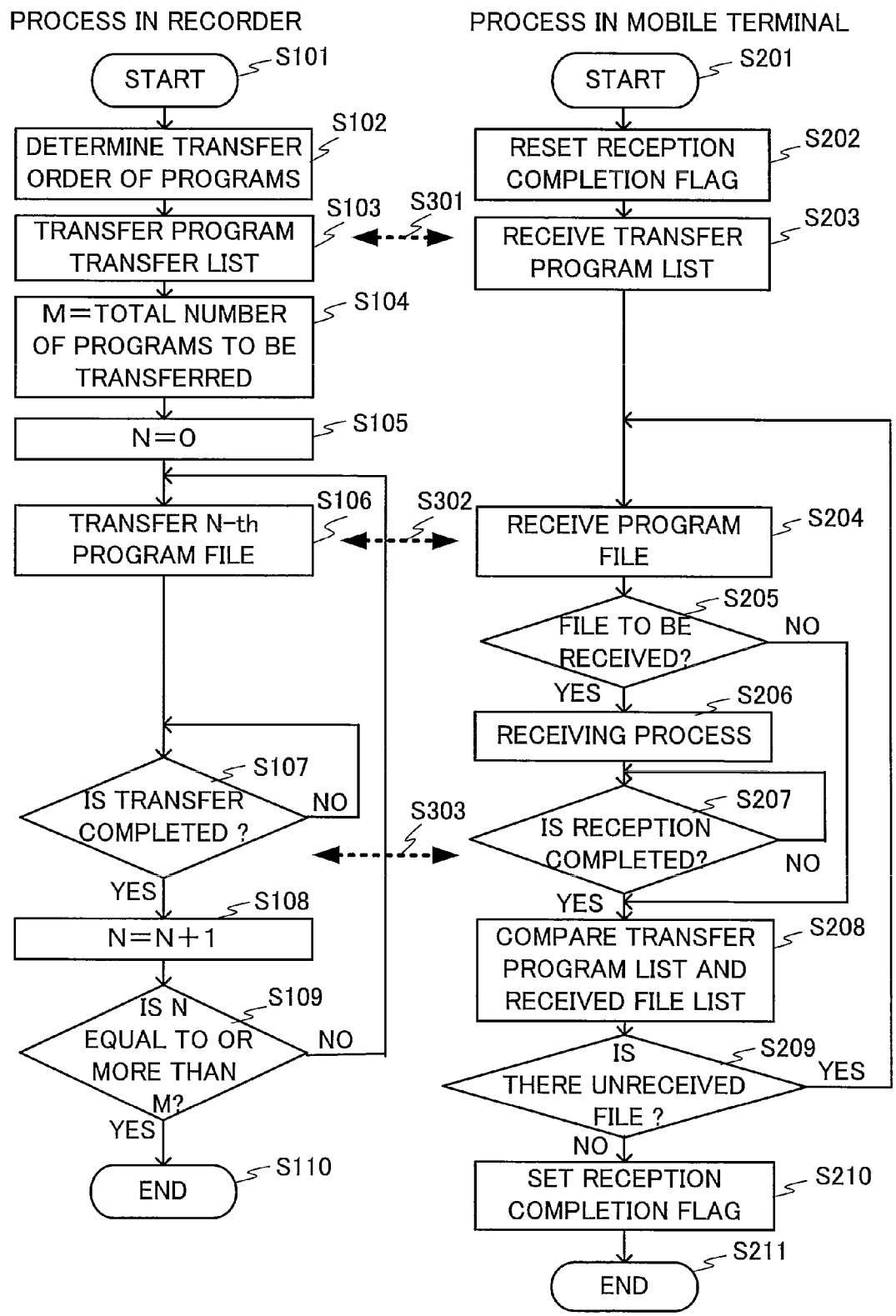
FIG. 7 is a flowchart showing a process in the recorder and a process in the mobile terminal in the first embodiment.

FIG. 7 is a flowchart showing a process in the recorder 10 and a process in the mobile terminals 21, 31 and 41, in the first embodiment. First, the process in the recorder 10 will be described. As shown in FIG. 7, the recorder 10 that begins a process of program file transfer determines the order of transfers of the program files (steps S101, S102). The order of transfers is, for example, one shown in FIG. 6. Next, the recorder 10 creates a transfer program list(s) indicating a program(s) to be transferred to each of the mobile terminals 21, 31 and 41 to transfer it (step S103, a broken-line arrow S301). Next, the total number of programs to be transferred is input as a parameter M (step S104), and a parameter N is initialized (step S105). In the example of FIG. 6, a value of the parameter M is 4. Next, the N-th program file is transferred (step S106, a broken-line arrow S302), if the transfer of the N-th program file is completed (step S107), N is incremented by 1 (step S108), if the parameter N is smaller than the parameter M, the transfers of the program files of all programs included in the transfer program list are not completed, and therefore the recorder 10 returns its process to step S106 (step S109). In step S108, if the parameter N is equal to or larger than the parameter M, it can be judged that the transfers of program files of all programs included in the transfer program list are completed, and therefore the recorder 10 terminates its process (step S110).

Next, the process in the mobile terminals 21, 31 and 41 will be described. As shown in FIG. 7, the mobile terminals 21, 31 and 41 reset a receipt completion flag (steps S201, S202), and receive the transfer program lists transferred from the recorder 10 (step S203, a broken-line arrow S301). Next, the mobile terminals 21, 31 and 41 receive the program files (step S204, a broken-line arrow S302), and confirm whether they are files to be received (step S205). In step S205, if it is judged that it is a file to be received, the mobile terminals 21, 31 and 41 perform receipt processing until the receipt is completed (steps S206, S207, a broken-line arrow S303). In step S207, if the receipt is completed or, in step S205, if it is judged that it is not a file to be received, the mobile terminals 21, 31 and 41 compare the transfer program lists with the received file lists (step S208), and determine whether there is an unreceived file or not (step S209). In step S209, if it is judged that there is an unreceived file, the mobile terminals 21, 31 and 41 proceed with their processes to step S204, receive the program files, and if it is judged that there is no unreceived file, the receipt completion flag is set to terminate the process (step S211). In step S210, the receipt completion flag is set, and therefore each of the mobile terminals 21, 31 and 41 can display the receipt completion of the necessary file on the monitor 211.

Figure 8:
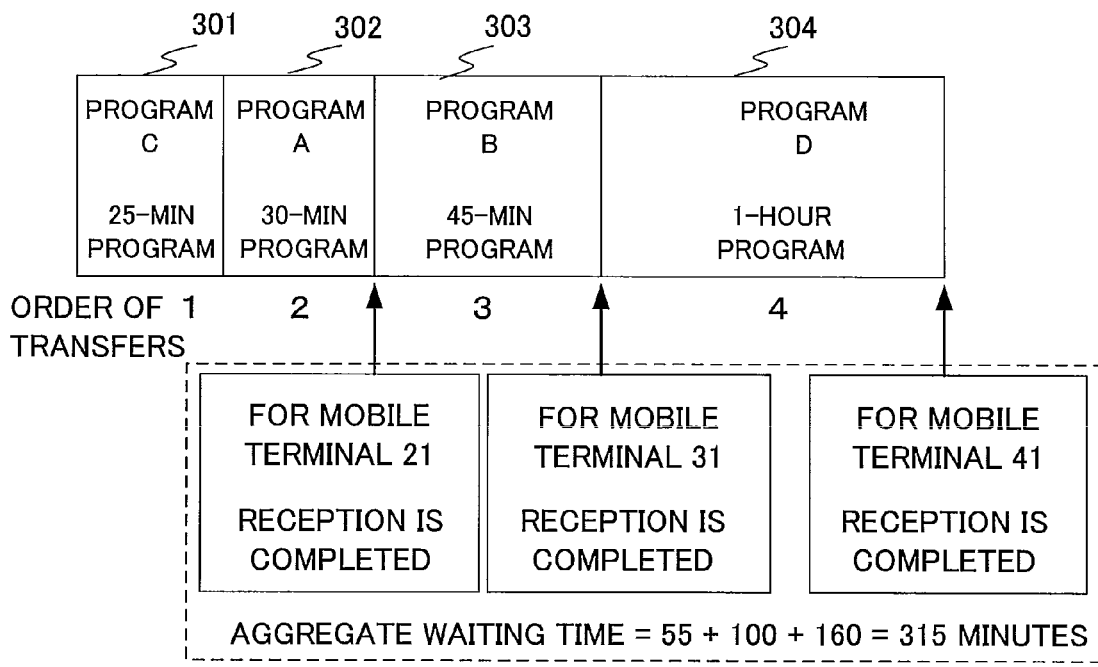
FIG. 8 is a diagram showing the order of transfers of the program files, waiting time in the mobile terminals, and aggregate waiting time, in the file transfer method according to the first embodiment.

FIG. 8 is a diagram showing the order of transfers of the program files, waiting time in the mobile terminals 21, 31 and 41, and aggregate waiting time, in the file transfer system of the first embodiment. As shown in FIG. 8, the transfer program files are transferred in order of program files, which is the ascending order of transfer time. In FIG. 8, the program files are transferred from the recorder in order of program C, program A, program B, and program D. Since the transfer program list for the mobile terminal 21 includes program A and program C, the mobile terminal 21 completes receipt at a point of time when it received the program files of program C and program A. In this case, waiting time of the user of the mobile terminal 21 is 55 minutes (=25 minutes+30 minutes). Since the transfer program list for the mobile terminal 22 includes program A and program B, the mobile terminal 22 completes receipt at a point of time when it received the program files of program A and program B. In this case, waiting time of the user of the mobile terminal 22 is 100 minutes (=25 minutes+30 minutes+45 minutes). Since the transfer program list for the mobile terminal 23 includes program A, program B, program C and program D, the mobile terminal 23 completes receipt at a point of time when it received the program files of program C, program A, program B, and program D. In this case, waiting time of the user of the mobile terminal 23 is 160 minutes (=25 minutes+30 minutes+45 minutes+60 minutes). Accordingly, in the example shown in FIG. 8, aggregate waiting time of the whole users is 315 minutes (=55 minutes+100 minutes+160 minutes).

Figure 9:
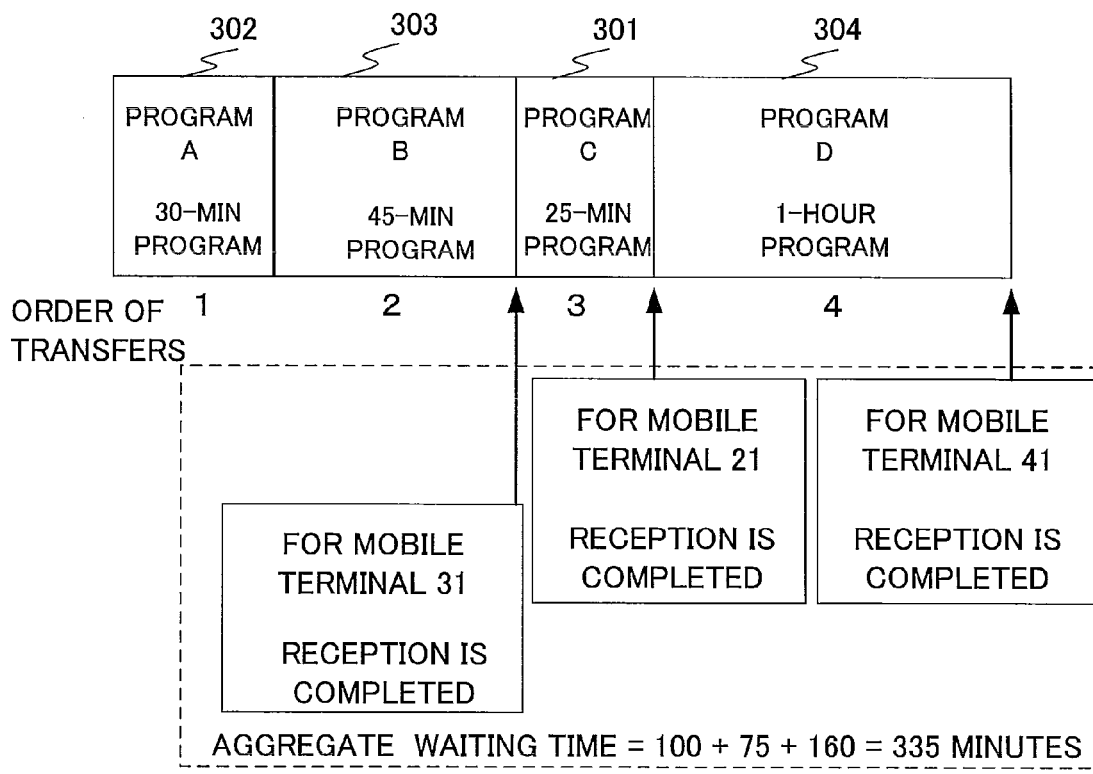
FIG. 9 is a diagram showing the order of transfers of the program files, waiting time in the mobile terminals, and aggregate waiting time, in a file transfer method of a comparative example.

FIG. 9 is a diagram showing the order of transfers of the program files, waiting time in the mobile terminals, and aggregate waiting time, in the file transfer method of a comparative example. In the comparative example of FIG. 9, the transfer program files are transferred in order of program A, program B, program C, and program D instead of the order of program files, which is the ascending order of transfer time. Since the transfer program list for the mobile terminal 21 includes program A and program C, the mobile terminal 21 completes receipt at a point of time when it received program files of program A and program C. In this case, waiting time of the user of the mobile terminal 21 is 100 minutes (=30 minutes+45 minutes+25 minutes). Since the transfer program list for the mobile terminal 22 includes program A and program B, the mobile terminal 22 completes receipt at a point of time when it received the program files of program A and program B. In this case, waiting time of the user of the mobile terminal 22 is 75 minutes (=30 minutes+45 minutes). Since the transfer program list for the mobile terminal 23 includes program A, program B, program C and program D, the mobile terminal 23 completes receipt at a point of time when it received the program files of program A, program B, program C, and program D. In this case, waiting time of the user of the mobile terminal 23 is 160 minutes (=25 minutes+30 minutes+ 45 minutes+60 minutes). Accordingly, in the example shown in FIG. 9, aggregate waiting time of the whole users is 335 minutes (=100 minutes+75 minutes+160 minutes).

As can be understood from comparison of the file transfer method of the first embodiment shown in FIG. 8 and the file transfer method of the comparative example shown in FIG. 9, a total value of the waiting time of the users, i.e., aggregate waiting time of the whole users can be shortened by adopting the transfer from the recorder 10 in ascending order of file size. Accordingly, when the files are simultaneously transferred to a large number of mobile terminals, the transfer to a mobile terminal requesting only data of a small file size can be completed in a short time. That is, waiting time of the user requesting a small amount of program file(s) can be minimum necessary without being influenced by the users requesting transfer of a large amount of program file(s), and therefore unpleasant feeling of the user resulting from the waiting time of file transfer can be reduced. Further, since remaining time can be displayed, prediction of the waiting time is possible and unpleasant feeling of the user can be reduced.

Furthermore, when the remaining time necessary for the transfer is displayed on each of the mobile terminals 21, 31 and 41 on the basis of the transfer time predicted to be necessary for the transfers in the list previously transferred from the recorder 10, the user (the mobile terminal) requesting receipt of some files of a plurality of program files to be transferred using a multicast protocol can predict a time when the transfer of necessary files is completed.

Moreover, when the completion is displayed at the time of the transfer completion, the transfer completion of each of the mobile terminals 21, 31 and 41 can be confirmed by their monitors 211.

Further, since each of the mobile terminals 21, 31 and 41 can display the remaining time necessary for the transfer on their monitors 211, the users can know how long they should wait for until the transfer completion, thereby reducing unpleasant feeling due to being made to wait for during the transfer.

Furthermore, in the first embodiment, a case where the network 81 is a wireless network has been described, the present invention can be comprised by a network other than the wireless network, for example, the ETHERNET (registered trade mark), the USB, or the like, or a network system that enables of one-to-multi communication or multicast communication.

Second Embodiment

In the first embodiment, the description has been made as to a case where the number of mobile terminals (hereinafter also referred to as "the number of users") is three and the number of programs is four, but in the second embodiment, a description will be made as to a file transfer method and a file transfer system for transferring program files from a single recorder to five mobile terminals, in which the single recorder is used at typical home and each person of a family of five (i.e., five users) has a mobile terminal. Further, in the second embodiment, a description will be made as to a case where the number of programs stored in the recorder is ten. The file transfer method of the second embodiment is the same as the file transfer method of the first embodiment in a point that programs are transferred in order of program files, which is the ascending order of transfer time. The file transfer method of the second embodiment is different from the file transfer method of the first embodiment in a point that a matrix is used when determining the order of transfers of the program files. However, it is possible to apply a method of setting the order of transfers in the second embodiment to the file transfer method of the first embodiment.

FIG. 10 is a diagram showing an example of a transfer program list 400 summarizing the user's transfer requests for each of ten programs desired to be transferred, among programs stored in the recorder 10 in FIG. 1. Each of the users U1 to U5 specifies programs to be transferred (any of program Nos. 1 to 10) using the mobile terminal so that the transfer program list 400 in FIG. 10 is created in the recorder 10. For example, a section 401 in the transfer program list 400 in FIG. 10 indicates that transfer time (transfer prediction time) of a program file of program Nos. 1 is "15" and the user U1 desires its transfer. Further, for example, a section 404 in the transfer program list 400 in FIG. 10 indicates that transfer time (transfer prediction time) of a program file of program No. 4 is "90" and the users U1, U3 and U4 desire its transfer. Similarly, sections 402, 403, 405 to 410 in FIG. 10 indicate transfer time and the users requesting transfers regarding the program files of program Nos. 2, 3, and 5 to 10. A unit of the transfer time may be any unit of time, for example, "minute" or "second". Therefore, a unit of the transfer time is not expressed in the following description.

FIG. 11 is a diagram showing a determinant used for calculating, from the transfer program list 400 in FIG. 10, sum totals T1 to T5 of transfer time necessary for transferring the program files to the mobile terminals of each of the users U1 to U5 (also referred to as "sum totals of transfer time of each user" or "sum totals of transfer time of each mobile terminal"). In FIG. 11, the sum totals T1 to T5 of transfer time for each user is expressed as column 421 on the left side of the determinant. Further, in FIG. 11, the transfer time of program files of program Nos. 1 to 10 (a numeral 424) are expressed as column 423 at the second term on the right side of the determinant. Furthermore, a matrix 422 shown as the first term on the right side of the determinant in FIG. 11 is a matrix used for calculating the sum totals T1 to T5 of transfer time for each user from the transfer time expressed as column 423 of the program files. The matrix 422 in FIG. 11 can be obtained from the section of user requesting transfer in the transfer program list 400 in FIG. 10. For example, in the section of user requesting transfer in FIG. 10, programs requested by the user U1 are program Nos. 1, 3, 4, 5 and 9, and a row of the first line at the matrix 422 in FIG. 11 is expressed as "1011100010" when "1" is defined as "transfer is requested" and "0" is defined as "transfer is not requested". The rows of the second to fifth lines in the matrix 422 shown in FIG. 11 indicate "transfer is requested" or "transfer is not requested" for the users U2 to U5.

From the determinant in FIG. 11, the sum totals T1 to T5 of transfer time for each user can be calculated. For example, the sum total T1 of transfer time of the program files for the user U1 will be calculated by the following expression.

$$T1 = (1 \times 15) + (0 \times 30) + (1 \times 60) + (1 \times 90) + (1 \times 30) +$$
$$(0 \times 60) + (0 \times 45) + (0 \times 60) + (1 \times 15) + (0 \times 15)$$
$$= 210$$

The sum totals T2 to T5 of transfer time of the program files for the users U2 to U5 will be calculated from the determinant shown in FIG. 11 in a similar manner.

The determinant in FIG. 11 shows the sum totals T1 to T5 of transfer time of the program files, transfers of which are requested by each of the users U1 to U5, and the matrix 422 can define the order of transfers of the program files. For example, as shown in FIG. 12, the matrix 422 can define that the program files are transferred in sequential order from the left column toward right.

Further, since the transfers of program files to a plurality of mobile terminals are performed using a multicast transfer method as has been described in the first embodiment, the program files can be transferred simultaneously (in parallel) to all of the plurality of users U1 to U5 in order of transfers indicated by the matrix 422 in FIG. 12. Accordingly, in the determinant shown in FIG. 11, the program files can be transferred simultaneously (in parallel) to all of the plurality of users U1 to U5 in sequential order from the program file of program No. 1.

In the case of adopting the order of transfers shown in FIG. 12, the sum totals T1 to T2 of transfer time for each user and the order of transfers of the program files are specified by the determinant in FIG. 11. A rightmost element (component) of a value "1" on each row in the matrix 422 in FIG. 12 indicates a receipt completion in each mobile terminal (i.e., transfer completion for each user). For example, on a row of the first line in the matrix 422 in FIG. 12, since the ninth element (component) from the left is a value "1" and the tenth element from the left is a value "0", a period of time from a start of the transfers using a multicast protocol to the user U1 to completion of all of the transfers of the digital data files scheduled to be received by each of the terminal devices (a point of time corresponding to the ninth element from the left) is waiting time P1 of the user U1. Similarly, waiting time P2 to P5 of the users U2 to U5 can be calculated from the second row to the fifth row in the matrix 422. Accordingly, the program transfers to each of the users U1 to U5 can be completed in a short time by arranging the elements of a value "1" to be placed as near to the left as possible. As a result, aggregate waiting time (P1+P2+P3+P4+P5) of transfers of the program files for the users can be shortened.

Practically, since it is necessary also to consider the transfer time of each of the program files, there may be cases where the optimal solution cannot be obtained by placing the elements of a value "1" in the matrix 422 in FIG. 12 as near to the left as possible. For this reason, by using a combination of the matrix 422 and another condition such as transfer time of each of the program files, it becomes possible to implement efficient program transfer of the program transfer to each user. In the combination optimization problem for obtaining optimal order of transfers, which is known as, for example, "Traveling Salesman Problem" or "Knapsack problem", it is considerably difficult to obtain an optimal solution. If all combinations are considered, an optimal solution can be obtained, but in the second embodiment, since the number of combinations is the factorial of 10 (=3,628,800) and the computing amount is increased, it is unreasonable. Therefore, an approximate solution of the combination is obtained from solutions satisfying conditions. The above-mentioned condition is that the elements of a value "1" in the matrix 422 are collected as near to the left as possible and sum total time (aggregate waiting time) P1+P2+P3+P4+P5 of the waiting time P1 to P5 of the users U1 to U5 is made minimal.

First, the determinant in FIG. 11 is expressed in a tabular form as shown in FIG. 13 in order to derive a solution satisfying these conditions as enough as possible. That is, column 421 indicating the sum totals T1 to T5 of transfer time to each of the users U1 to U5 in FIG. 11 is expressed by a matrix 442 in FIG. 13, column 423 of transfer time of the program files of program Nos. 1 to 10 in FIG. 11 is expressed by a row 443 in FIG. 13, and program Nos. 1 to 10 shown at the section 424 in FIG. 11 is expressed by program Nos. 1 to 10 shown as a row 444 in FIG. 13.

In FIG. 13, the number (the number of programs to be transferred) of programs (programs scheduled to be transferred) requested to be transferred by each of the users U1 to U5 is shown on column 445, and the sum totals (sum totals of transfer time of the selected programs) T1 to T5 of transfer time of programs requested to be transferred by the users is shown on column 446. In the example in FIG. 13, an aggregate (=T1+T2+T3+T4+T5) of the sum totals T1 to T5 of transfer time of the program files requested to be transferred by the users U1 to U5 is "870".

Referring to FIG. 13, the waiting time (waiting time until completion of transfers to the users) P1 to P5 from a start of the transfers in sequential order of transfers in FIG. 12 using a multicast protocol to the users U1 to completion of all of the transfers of the programs scheduled to be transferred to each of the terminal devices is calculated. For example, regarding the user U1, since the rightmost "1" in the matrix 442 is at a position of program No. 9, the transfer is performed in sequential order from program No. 1 to program No. 9. Therefore, the waiting time P1 from a start of the transfers from the recorder 10 using a multicast protocol to the user U1 to completion of all of the transfers of the programs scheduled to be transferred to each of the terminal devices can be calculated by the following equation.

$$P1 = (1 \times 15) + (1 \times 30) + (1 \times 60) + (1 \times 90) +$$
$$(1 \times 30) + (1 \times 60) + (1 \times 45) + (1 \times 60) + (1 \times 15)$$
$$= 405$$

Regarding the user U2, since the rightmost "1" on a row of the second line in the matrix 442 is at a position of program No. 9, the transfer is performed in sequential order from a program file of program No. 1 to a program file of program No. 9. Therefore, the waiting time (waiting time until completion of transfers to the user U2) P2 from a start of the transfers using a multicast protocol to the user U2 to completion of all of the transfers of the programs scheduled to be transferred to each of the terminal devices is calculated in a similar manner. Regarding the users U3 to U5, the time lengths (waiting time) P3 to P5 from a start of the transfers in order of transfers using a multicast protocol to completion of all of the transfers of the programs scheduled to be transferred to each of the terminal devices are calculated in a similar manner.

The waiting time P1 to P5 until completion of transfers of all of the programs scheduled to be transferred are as shown on column 447 in FIG. 14. In this case, a sum total (aggregate waiting time) P1+P2+P3+P4+P5 of the waiting time of all users U1 to U5 is "1950". In this case, although the transfer time T5 of the program file (program No. 10) requested to be transferred by the user U5 is "15", the waiting time P5 of the user U5 is "420" and it is extremely long in comparison with the transfer time.

Figure 15:
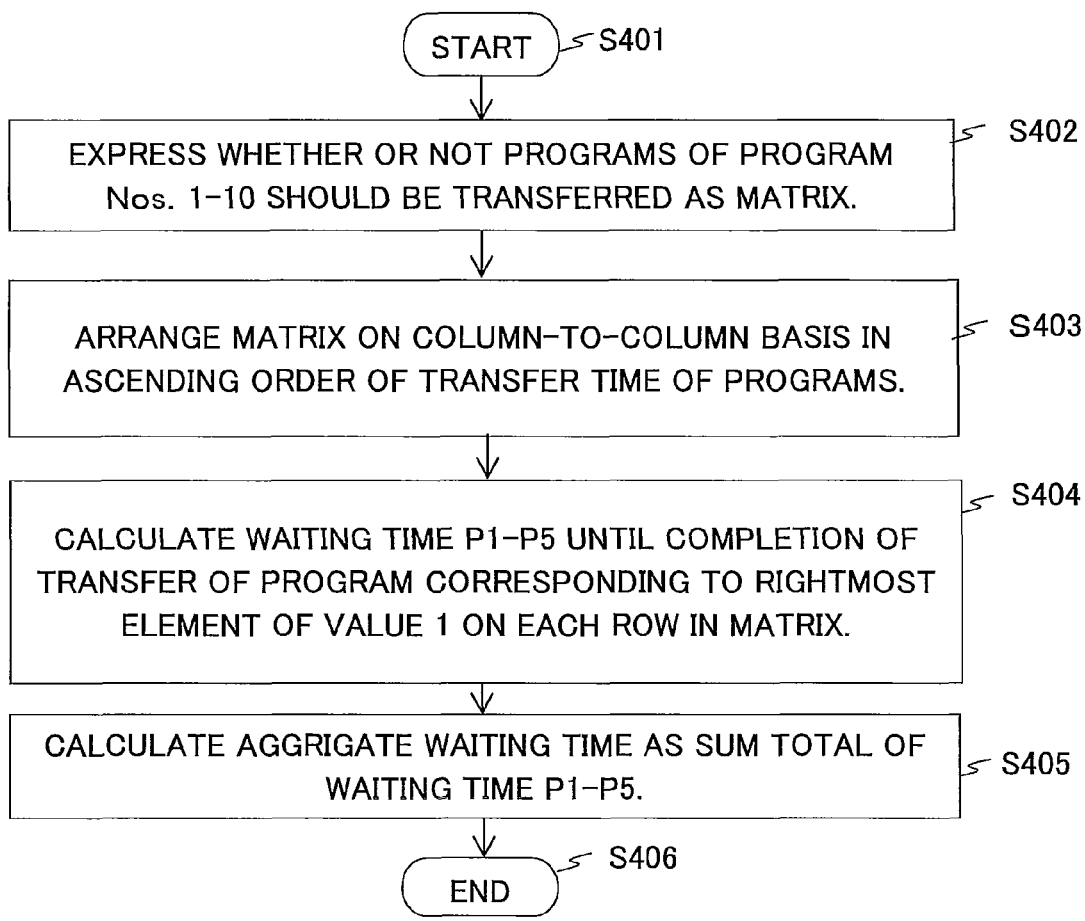
FIG. 15 is a flowchart showing a file transfer method according to the second embodiment.

Further, in a similar manner to the first embodiment, a process for determining order of transfers so that the program files are transferred in ascending order of transfer time with reference to a flowchart in FIG. 15. As shown in FIG. 15, the recorder 10 starts a process on the basis the transfer request from the mobile terminal of each of the users U1 to U5 (step S401), and expresses information regarding the transfer time of the program files of program Nos. 1 to 10 to each of the users U1 to U5 (step S402). Next, using the transfer time 443 as a key, the matrix is rearranged (sorted) on a column-to-column basis in order of programs, which is the ascending order of the transfer time (step S403). Next, the matrix is rearranged on a column-to-column basis so that the waiting time P1 to P5 corresponding to the rightmost element of a value "1" on each row in the matrix become short (step S404), and the aggregate waiting time as a sum total of waiting time P1 to P5 of all users is calculated (step S405) to terminate the process (step S406).

FIG. 16 is a diagram showing an acquired result of the order of transfers from the table in FIG. 13 on the basis of the process of the flowchart in FIG. 15. Column 448 in the table in FIG. 16 indicates waiting time P1 to P5 until transfer completion for each user, and aggregate waiting time P1+P2+P3+P4+P5 as a sum total of the waiting time P1 to P5 is "1635". This value is shortened value in comparison with the aggregate waiting time "1950" in the example shown in FIG. 14.

Third Embodiment

Figure 17:
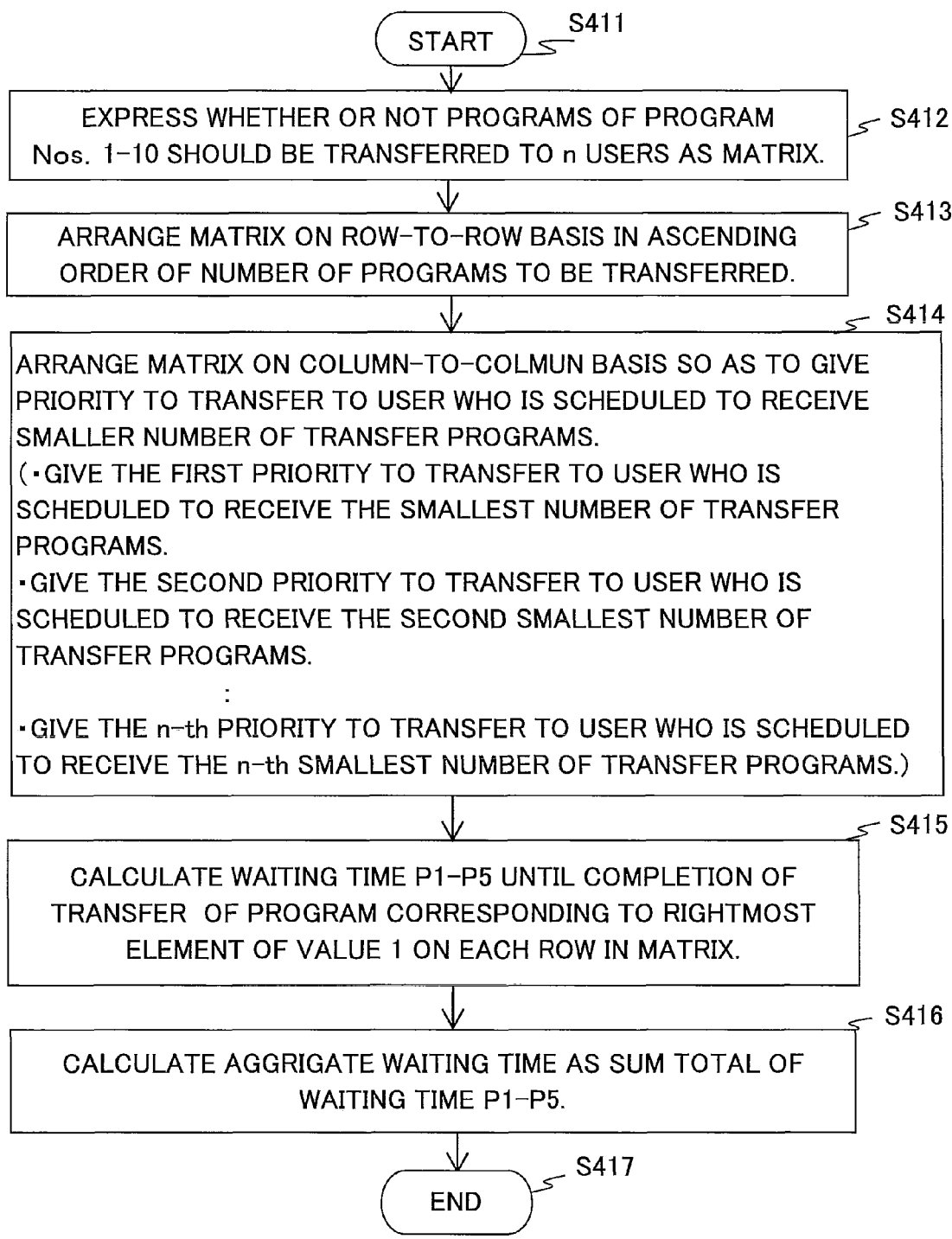
FIG. 17 is a flowchart showing a file transfer method according to the third embodiment of the present invention.

FIG. 17 is a flowchart showing a file transfer method according to the third embodiment (operation of a file transfer system according to the third embodiment) of the present invention. Further, FIG. 18 is a diagram showing a table obtained at step S413, in which rearrangement (sort) on a column-to-column basis in FIG. 17 is performed. Furthermore, FIG. 19 is a diagram showing a table obtained at step S414, in which a sort on a column-to-column basis shown in FIG. 17 is performed. In the file transfer method according to the third embodiment, by transferring the program files preferentially in order of users, which is the ascending order of the number of programs to be transferred, a sum total of transfer time to all users is shortened.

In the file transfer method according to the third embodiment, as shown in FIG. 17, the recorder 10 starts a process on the basis of the transfer request from the mobile terminal of each of the users U1 to U5 (step S411), and express information regarding transfer time of program files of program Nos. 1 to 10 to each of the users U1 to U5 as a table (step S412). Next, using the number of programs to be transferred as a key, the matrix is rearranged (sorted) on a column-to-column basis in ascending order of the number of programs to be transferred to create a table shown in FIG. 18 (step S413). Next, on each row in the matrix, in order to obtain the short waiting time P1 to P5 until completion of transfer of a program corresponding to the rightmost element of a value "1", the matrix is rearranged on a column-to-column basis to create a table shown in FIG. 19 (step S414). Next, the waiting time P1 to P5 for all users U1 to U5 are calculated (step S415) and aggregate waiting time as a sum total of the waiting time is calculated (step S416), and then the process terminates (step S417).

Further, at step S414 in FIG. 17, rearrangement on a column-to-column basis is performed, wherein the column includes a matrix 452, transfer time 453, and program Nos. (section 454), that is, rearrangement on a column-to-column basis in the section 457 using the priority key shown below is performed.

As shown in FIG. 19, first, using a row of the user whose number of programs to be transferred is the smallest as a priority key, rearrangement on a column-to-column basis is performed. In this rearrangement, the column of program No. 10 moved to the leftmost in the section 457.

Next, rearrangement on a column-to-column basis is performed using a row of the user whose number of programs to be transferred is the second smallest as a priority key. By this rearrangement, three columns in program Nos. 4, 6 and 7 move to the second, the third and the fourth columns from the left in the section 457.

Next, rearrangement on a column-to-column basis is performed using a row of the user whose number of programs to be transferred is the third smallest as a priority key. By this rearrangement, two columns in program Nos. 3 and 8 move to the fifth and the sixth columns from the left in the section 457.

Next, rearrangement on a column-to-column basis is performed using a row of the user whose number of programs to be transferred is the fourth smallest as a priority key. By this rearrangement, three columns in program Nos. 5, 9 and 1 move to the seventh, the eighth and the ninth columns from the left in the section 457.

Finally, rearrangement on a column-to-column basis is performed using a row of the user whose number of programs to be transferred is the fifth smallest as a priority key. By this rearrangement, a column in program No. 2 move to the tenth column from the left in the section 457.

FIG. 19 is a table obtained from the order of transfers (order of transfers based on the number of programs to be transferred) according to the flowchart in FIG. 17 using the table in FIG. 13. Aggregate waiting time as a sum total of the waiting time P1 to P5 of all users is "1365", and the aggregate waiting time can be shortened still more in comparison with the second embodiment.

Fourth Embodiment

In the third embodiment the description has been made as to a case where the program files are transferred preferentially in the ascending order of the number of programs to be transferred, but in the fourth embodiment, a description will be made as to a case where the transfers are performed in order of users, which is the ascending order of transfer time of the program files requested to be transferred (priority is given to the user who requests the transfer of the program file whose transfer time is short). FIG. 20 shows an example of the transfer program list 500 in the file transfer method according to the fourth embodiment, and FIG. 21 is a flowchart showing the file transfer method according to the fourth embodiment (operation of the file transfer system according to the fourth embodiment).

Figure 21:
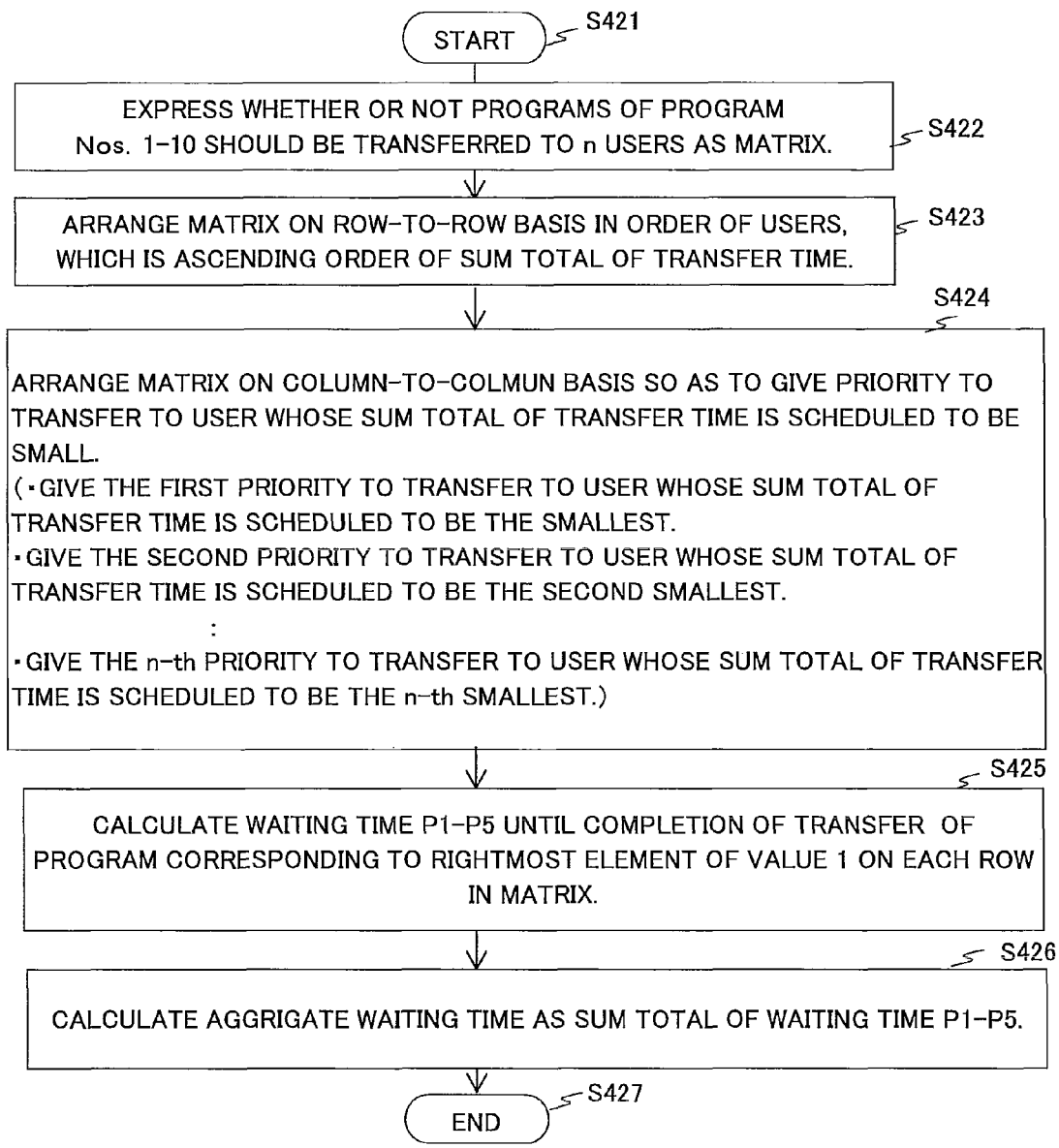
FIG. 21 is a flowchart showing a file transfer method according to the fourth embodiment.

In the file transfer method according to the fourth embodiment, as shown in FIG. 21, the recorder 10 starts a process on the basis of the transfer request from the mobile terminal of each of the users U1 to U5 (step S421), and expresses information regarding transfer time of the program files of program Nos. 1 to 10 to each of the users U1 to U5 as a matrix (step S422). Next, using the sum totals of transfer time for each user as a key, the matrix is rearranged (sorted) on a column-to-column basis in order of users, which is the ascending order of the sum totals of transfer time (step S423). Next, the matrix is rearranged on a column-to-column basis so that the waiting time P1 to P5 corresponding to the rightmost element of a value "1" on each row in the matrix become short (step S424), the waiting time P1 to P5 are calculated for all users (step S425), aggregate waiting time as a sum total of waiting time is calculated (step S426), and the process terminates (step S427).

Further, at step S424 in FIG. 21, rearrangement on a column-to-column basis is performed, wherein the column includes a matrix 472, transfer time 473, and program number (section 474), that is, rearrangement on a column-to-column basis in the section 477 using the priority key shown below is performed.

As shown in FIG. 22, first, using a row of the user whose sum total of transfer time is the smallest as a priority key, rearrangement on a column-to-column basis is performed. In this rearrangement, the four columns of program Nos. 1, 2, 3 and 5 moves to the first, the second, the third, and the fourth columns from the left in the section 477.

Next, rearrangement on a column-to-column basis is performed using a row of the user whose sum total of transfer time is the second smallest as a priority key. By this rearrangement, two columns in program Nos. 4 and 6 move to the fifth and the sixth columns from the left in the section 477.

Next, rearrangement on a column-to-column basis is performed using a row of the user whose sum total of transfer time is the third smallest as a priority key. By this rearrangement, a column in program No. 7 moves to the seventh column from the left in the section 477.

Next, rearrangement on a column-to-column basis is performed using a row of the user whose sum total of transfer time is the fourth smallest as a priority key. By this rearrangement, two columns in program Nos. 9 and 10 move to the eighth and the ninth columns from the left in the section 477.

Finally, rearrangement on a column-to-column basis is performed using a row of the user whose sum total of transfer time is the fifth smallest as a priority key. By this rearrangement, a column in program No. 8 moves to the tenth column from the left in the section 477.

In the file transfer method of the fourth embodiment described above, the order of transfers based on the sum totals of the transfer time for each user is adopted and as shown as column 480 in FIG. 22, aggregate waiting time is "1005".

Further, if the transfer program list 500 in FIG. 20 is transferred on the basis of the flowchart in FIG. 15 (a method using the order of transfers based on the transfer time of the program files) is as shown in FIG. 23, and aggregate waiting time is "1080" as shown below column 481.

Furthermore, if the transfer program list 500 in FIG. 20 is transferred on the basis of the flowchart in FIG. 17 (a method using the order of transfers based on the number of programs to be transferred) is as shown in FIG. 24, and aggregate waiting time is "1425" as shown below column 482 in FIG. 24.

As can be understood from comparison these values of the aggregate waiting time, according to the file transfer method of the fourth embodiment, the aggregate waiting time of the user can be shortened.

Fifth Embodiment

A file transfer method of the fifth embodiment adopts a method of implementing the shortest aggregate waiting time of users from among a plurality of different methods. In the fifth embodiment, for example, aggregate waiting time (a first time length) is calculated on the basis of the file transfer method of the above-described second embodiment, aggregate waiting time (a second time length) is calculated on the basis of the file transfer method of the above-described third embodiment, aggregate waiting time (a third time length) is calculated on the basis of the file transfer method of the above-described fourth embodiment, and the first time length, the second time length and the third time length are compared to select one of the file transfer methods having the shortest time length from among them. Further, the above-mentioned plurality of different methods may be two methods or may be four or more methods. In the file transfer method of the fifth embodiment, the file transfer method is selected on the basis of the first time length, the second time length, and the third time length.

The first time length is aggregate waiting time when a first matrix obtained by arranging the order of a plurality of columns corresponding to a plurality of program files is used as the matrix in FIG. 12 so that a plurality of program files are transferred in order of program files, which is the ascending order of the transfer time. The first time length is, for example, aggregate waiting time in the file transfer method of the above-mentioned second embodiment shown in FIG. 16.

The second time length is aggregate waiting time when a second matrix obtained by arranging a plurality of rows corresponding to a plurality of terminal devices is used as the matrix in FIG. 12 so that a plurality of program files are transferred in order of terminal devices, which is the ascending order of program files to be received. The second time length is, for example, aggregate waiting time in the file transfer method of the above-mentioned third embodiment shown in FIG. 19.

The third time length is aggregate waiting time when a third matrix obtained by arranging a plurality of rows corresponding to a plurality of terminal devices is used as the matrix in FIG. 12 so that the transfers of a plurality of program files are completed in order of terminal devices, which is the ascending order of the sum totals of transfer time of the programs files scheduled to be transferred. The third time length is, for example, aggregate waiting time in the file transfer method of the above-mentioned fourth embodiment shown in FIG. 25.

Aggregate waiting time (the first time length), when the method of arranging the matrix in ascending order of transfer time of the program files as shown in FIG. 16 is adopted, is "1635", aggregate waiting time (the second time length), when the method of arranging the matrix in ascending order of the number of programs to be transferred for each user as shown in FIG. 19 is adopted, is "1365", and aggregate waiting time (the third time length), when the method of arranging the matrix in ascending order of the sum totals of transfer time for each user as shown in FIG. 25 is adopted, is "1380". In the file transfer method of the fifth embodiment, the program files are transferred in order of transfers in FIG. 19 that implements the shortest aggregate waiting time. As described above, the file transfer method of the fifth embodiment can shorten the aggregate waiting time of the users.

What is claimed is:

1. A file transfer method of transferring a plurality of digital data files using a multicast protocol from an information recording apparatus storing the plurality of digital data files via a network to a plurality of terminal devices, the method comprising:

determining by the information recording apparatus, a matrix defining an order of transfers when transferring the plurality of digital data files to the plurality of terminal devices; and transferring by the information recording apparatus, the plurality of digital data files to the plurality of terminal devices in accordance with the matrix defining the order of transfers;

wherein, in the step of determining the matrix, a correspondence between the plurality of terminal devices and the plurality of digital data files to be transferred to the plurality of terminal devices is expressed in the matrix, such that the plurality of terminal devices correspond to a plurality of rows and the plurality of digital data files correspond to a plurality of columns in the matrix, the matrix is arranged on a row-to-row basis in an ascending order of numbers of the digital data files to be received by the terminal devices, and the arranged matrix is rearranged on a column-to-column basis so that a priority of transfer is given to the terminal devices in an order from a top row to a bottom row of the plurality of rows of the rearranged matrix.

2. A file transfer method of transferring a plurality of digital data files using a multicast protocol from an information recording apparatus storing the plurality of digital data files via a network to a plurality of terminal devices, the method comprising:

determining by the information recording apparatus, a matrix defining an order of transfers when transferring the plurality of digital data files to the plurality of terminal devices; and transferring by the information recording apparatus, the plurality of digital data files to the plurality of terminal devices in accordance with the matrix defining the order of transfers;

wherein, in the step of determining the matrix, a correspondence between the plurality of terminal devices and the plurality of digital data files to be transferred to the plurality of terminal devices is expressed in the matrix, such that the plurality of terminal devices correspond to a plurality of rows and the plurality of digital data files correspond to a plurality of columns in the matrix, the matrix is arranged on a row-to-row basis in an ascending order of sum totals of transfer time of the digital data files to be received by the terminal devices, and the arranged matrix is rearranged on a column-to-column basis so that a priority of transfer is given to the terminal devices in an order from a top row to a bottom row of the plurality of rows of the rearranged matrix.

3. A file transfer method of transferring a plurality of digital data files using a multicast protocol from an information recording apparatus storing the plurality of digital data files via a network to a plurality of terminal devices, the method comprising:

determining by the information recording apparatus, a matrix defining an order of transfers when transferring the plurality of digital data files to the plurality of terminal devices; and transferring by the information recording apparatus, the plurality of digital data files to the plurality of terminal devices in accordance with the matrix defining the order of transfers;

wherein:

a time length from a start of the transfers using a multicast protocol to completion of the transfers of the digital data files scheduled to be received by each of the terminal devices is defined as waiting time of each of the terminal devices, a sum total of the waiting time of all of the plurality of terminal devices is defined as aggregate waiting time, and in the step of determining the matrix defining the order of transfers, a correspondence between the plurality of terminal devices and the plurality of digital data files to be transferred to the plurality of terminal devices is expressed in the matrix defining the order of transfers, such that the plurality of terminal devices correspond to a plurality of rows and the plurality of digital data files correspond to a plurality of columns in the matrix defining the order of transfers, the plurality of columns being arranged so that a priority of transfer is given to the terminal devices in an order from a top row to a bottom row of the plurality of rows;

the matrix defining the order of transfers is selected from:

a first matrix, in which the plurality of rows are arranged in an ascending order of numbers of the digital data files to be received by the corresponding terminal devices, a second matrix, in which the plurality of rows are arranged in an ascending order of sum totals of transfer time of the digital data files to be received by the corresponding terminal devices, and a third matrix, in which the plurality of columns are arranged in an ascending order of transfer times of the corresponding digital data files;

the matrix defining the order of transfers is selected by comparing a first time length being aggregate waiting time when the matrix defining the order of transfers is the first matrix, a second time length being aggregate waiting time when the matrix defining the order of transfers is the second matrix, and a third time length being aggregate waiting time when the matrix defining the order of transfers is the third matrix, and determining which one of the first to third matrices makes the aggregate waiting time minimal; and the one of the first to third matrices that makes the aggregate waiting time minimal is used as the matrix defining the order of transfers.

4. A file transfer system comprising:

an information recording apparatus configured to perform communication via a network; and a plurality of terminal devices configured to perform communication via the network;

wherein the information recording apparatus includes:

recording means for storing a plurality of digital data files;

a first processor programmed to perform a process of:

determining a matrix defining an order of transfers of the plurality of digital data files, and executing a control operation for transferring the plurality of digital data files via the network using a multicast protocol, the control operation being executed in accordance with the matrix;

wherein each of the plurality of terminal devices includes:

a second processor programmed to execute a control operation for selectively receiving the plurality of digital data files via the network;

wherein the first processor determines and expresses a correspondence between the plurality of terminal devices and the plurality of digital data files to be transferred to the plurality of terminal devices in the matrix, such that the plurality of terminal devices correspond to a plurality of rows and the plurality of digital data files correspond to a plurality of columns in the matrix, the matrix is arranged on a row-to-row basis in an ascending order of numbers of the digital data files to be received by the terminal devices, and the arranged matrix is rearranged on a column-to-column basis so that a priority of transfer is given to the terminal devices in an order from a top row to a bottom row of the plurality of rows of the rearranged matrix.

5. A file transfer system comprising:

an information recording apparatus configured to perform communication via a network; and a plurality of terminal devices configured to perform communication via the network;

wherein the information recording apparatus includes:
recording means for storing a plurality of digital data files;
a first processor programmed to perform a process of:
determining a matrix defining an order of transfers of the plurality of digital data files; and
executing a control operation for transferring the plurality of digital data files via the network using a multicast protocol, the control operation being executed in accordance with the matrix;
wherein each of the plurality of terminal devices includes:
a second processor programmed to execute a control operation for selectively receiving the plurality of digital data files;
wherein the first processor determines and expresses a correspondence between the plurality of terminal devices and the plurality of digital data files to be transferred to the plurality of terminal devices in the matrix, such that the plurality of terminal devices correspond to a plurality of rows and the plurality of digital data files correspond to a plurality of columns in the matrix, and
the matrix is arranged on a row-to-row basis in an ascending order of sum totals of transfer time of the digital data files to be received by the terminal devices, and
the arranged matrix is rearranged on a column-to-column basis so that a priority of transfer is given to the terminal devices in an order from a top row to a bottom row of the plurality of rows of the rearranged matrix.

6. A file transfer system comprising:
an information recording apparatus configured to perform communication via a network; and
a plurality of terminal devices configured to perform communication via the network;
wherein the information recording apparatus includes:
recording means for storing a plurality of digital data files;
a first processor programmed to perform a process of:
determining a matrix defining an order of transfers of the plurality of digital data files; and
executing a control operation for transferring the plurality of digital data files via the network using a multicast protocol, the control operation being executed in accordance with the matrix defining the order of transfers;
wherein each of the plurality of terminal devices includes:
a second processor programmed to execute a control operation for selectively receiving the plurality of digital data files;
wherein:
a time length from a start of the transfers using a multicast protocol to completion of the transfers of the digital data files scheduled to be received by each of the terminal devices is defined as waiting time of each of the terminal devices,
a sum total of the waiting time of all of the plurality of terminal devices is defined as aggregate waiting time,
the first processor determines and expresses a correspondence between the plurality of terminal devices and the plurality of digital data files to be transferred to the plurality of terminal devices in the matrix defining the order of transfers, such that the plurality of terminal devices correspond to a plurality of rows and the plurality of digital data files correspond to a plurality of columns in the matrix defining the order of transfers, the plurality of columns being arranged so that a priority of transfer is given to the terminal devices in an order from a top row to a bottom row of the plurality of rows, and the matrix defining the order of transfers is selected from:
a first matrix, in which the plurality of rows are arranged in an ascending order of numbers of the digital data files scheduled to be received by the corresponding terminal devices;
a second matrix, in which the plurality of rows are arranged in an ascending order of sum totals of transfer time of the digital data files to be received by the corresponding terminal devices; and
a third matrix, in which the plurality of columns are arranged in an ascending order of transfer time of the corresponding digital data files,
the first processor compares a first time length being aggregate waiting time when the matrix defining the order of transfers is the first matrix, a second time length being aggregate waiting time when the matrix defining the order of transfers is the second matrix, and a third time length being aggregate waiting time when the matrix defining the order of transfers is the third matrix, and
the first processor uses the one of the first to third matrices that makes the aggregate waiting time minimal as the matrix defining the order of transfers.

7. An information recording apparatus for performing a file transfer method of transferring a plurality of digital data files using a multicast protocol from the information recording apparatus storing the plurality of digital data files via a network to a plurality of terminal devices, comprising:
a first processor programmed to perform a process of:
determining a matrix defining an order of transfers of the plurality of digital data files to the plurality of terminal devices; and
transferring the plurality of digital data files on the basis of the matrix defining the order of transfers;
wherein each of the plurality of terminal devices includes:
a communication interface to the network; and
a second processor programmed to execute a control operation for selectively receiving the plurality of digital data files;
wherein the first processor determines and expresses a correspondence between the plurality of terminal devices and the plurality of digital data files to be transferred to the plurality of terminal devices in the matrix, such that the plurality of terminal devices correspond to a plurality of rows and the plurality of digital data files correspond to a plurality of columns in the matrix,
the matrix is arranged on a row-to-row basis in an ascending order of numbers of the digital data files to be received by the terminal devices, and
the arranged matrix is rearranged on a column-to-column basis so that a priority of transfer is given to the terminal devices in an order from a top row to a bottom row of the plurality of rows of the rearranged matrix.

8. An information recording apparatus for performing a file transfer method of transferring a plurality of digital data files using a multicast protocol from the information recording apparatus storing the plurality of digital data files via a network to a plurality of terminal devices, comprising:
a first processor programmed to perform a process of:
determining a matrix defining an order of transfers of the plurality of digital data files to the plurality of terminal devices; and
transferring the plurality of digital data files on the basis of the matrix defining the order of transfers;
wherein each of the plurality of terminal devices includes:
a communication interface to the network; and a second processor programmed to execute a control operation for selectively receiving the plurality of digital data files;

wherein the first processor determines and expresses a correspondence between the plurality of terminal devices and the plurality of digital data files to be transferred to the plurality of terminal devices in the matrix, such that the plurality of terminal devices correspond to a plurality of rows and the plurality of digital data files correspond to a plurality of columns in the matrix, the matrix is arranged on a row-to-row basis in an ascending order of sum totals of transfer time of the digital data to be received by the terminal devices, and the arranged matrix is rearranged on a column-to-column basis so that a priority of transfer is given to the terminal devices in an order from a top row to a bottom row of the plurality of rows of the rearranged matrix.

9. An information recording apparatus for performing a file transfer method of transferring a plurality of digital data files using a multicast protocol from the information recording apparatus storing the plurality of digital data files via a network to a plurality of terminal devices, comprising:

a first processor programmed to perform a process of:
  determining a matrix defining an order of transfers of the plurality of digital data files to the plurality of terminal devices; and
  transferring the plurality of digital data files on the basis of the matrix defining the order of transfers;

wherein:

a time length from a start of the transfers using a multicast protocol to completion of the transfers of the digital data files scheduled to be received by each of the terminal devices is defined as waiting time of each of the terminal devices, a sum total of the waiting time of all of the plurality of terminal devices is defined as aggregate waiting time, the first processor determines and expresses a correspondence between the plurality of terminal devices and the plurality of digital data files to be transferred to the plurality of terminal devices in the matrix defining the order of transfers, such that the plurality of terminal devices correspond to a plurality of rows and the plurality of digital data files correspond to a plurality of columns in the matrix defining the order of transfers, the plurality of columns being arranged so that a priority of transfer is given to the terminal devices in an order from a top row to a bottom row of the plurality of rows, the matrix defining the order of transfers is selected from:
  a first matrix, in which the plurality of rows are arranged in an ascending order of numbers of the digital data files to be received by the corresponding terminal devices;
  a second matrix, in which the plurality of rows are arranged in an ascending order of sum totals of transfer time of the digital data files to be received by the corresponding terminal devices; and
  a third matrix, in which the plurality of columns are arranged in an ascending order of transfer times of the corresponding digital data files, the first processor compares a first time length being aggregate waiting time when the matrix defining the order of transfers is the first matrix, a second time length being aggregate waiting time when the matrix defining the order of transfers is the second matrix, and a third time length being aggregate waiting time when the matrix defining the order of transfers is the third matrix, and the first processor uses the one of the first to third matrices that makes the aggregate waiting time minimal as the matrix defining the order of transfers.

* * * * *